US011772071B2

(12) United States Patent
Beach et al.

(10) Patent No.: US 11,772,071 B2
(45) Date of Patent: *Oct. 3, 2023

(54) METAL-DECORATED BARIUM CALCIUM ALUMINUM OXIDE AND RELATED MATERIALS FOR NH₃ CATALYSIS

(71) Applicant: STARFIRE ENERGY, Denver, CO (US)

(72) Inventors: Joseph D. Beach, Denver, CO (US); Jonathan D. Kintner, Denver, CO (US); Adam W. Welch, Denver, CO (US)

(73) Assignee: Starfire Energy, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,783

(22) Filed: Apr. 8, 2022

(65) Prior Publication Data

US 2022/0331780 A1  Oct. 20, 2022

Related U.S. Application Data

(63) Continuation of application No. 16/613,390, filed as application No. PCT/US2018/032759 on May 15, 2018, now Pat. No. 11,325,105.

(60) Provisional application No. 62/590,570, filed on Nov. 25, 2017, provisional application No. 62/506,463, filed on May 15, 2017.

(51) Int. Cl.
| | |
|---|---|
| B01J 23/02 | (2006.01) |
| B01J 23/46 | (2006.01) |
| B01J 35/00 | (2006.01) |
| B01J 35/04 | (2006.01) |
| B01J 37/00 | (2006.01) |
| B01J 37/04 | (2006.01) |
| B01J 37/08 | (2006.01) |
| B01J 37/16 | (2006.01) |
| C01B 3/04 | (2006.01) |
| C01F 7/16 | (2022.01) |

(52) U.S. Cl.
CPC ............ B01J 23/02 (2013.01); B01J 23/462 (2013.01); B01J 35/0033 (2013.01); B01J 35/04 (2013.01); B01J 37/0036 (2013.01); B01J 37/04 (2013.01); B01J 37/088 (2013.01); B01J 37/16 (2013.01); C01B 3/047 (2013.01); C01F 7/16 (2013.01)

(58) Field of Classification Search
CPC .................................. C01F 7/16; B01J 20/041
See application file for complete search history.

(56) References Cited

U.S. PATENT DOCUMENTS

| | | |
|---|---|---|
| 2,898,183 A | 8/1959 | Giacomo |
| 3,344,052 A | 9/1967 | Yeh |
| 3,395,982 A | 8/1968 | Didycz |
| 3,519,546 A | 7/1970 | Lee |
| 3,721,532 A | 3/1973 | Wright et al. |
| 3,932,139 A | 1/1976 | Vilceanu et al. |
| 4,215,099 A | 7/1980 | Pinto et al. |
| 4,312,640 A | 1/1982 | Verrando |
| 4,322,394 A | 3/1982 | Mezey et al. |
| 4,537,760 A | 8/1985 | Lavie |
| 4,567,315 A | 1/1986 | Owaysi et al. |
| 5,268,091 A | 12/1993 | Boitiaux et al. |
| 5,282,886 A | 2/1994 | Kobayashi et al. |
| 5,326,537 A | 7/1994 | Cleary |
| 5,584,175 A | 12/1996 | Carlborg et al. |
| 5,711,926 A | 1/1998 | Knaebel |
| 6,471,932 B1 | 10/2002 | Gieshoff et al. |
| 6,609,570 B2 | 8/2003 | Wellington et al. |
| 6,712,950 B2 | 3/2004 | Denvir et al. |
| 6,739,394 B2 | 5/2004 | Vinegar et al. |
| 6,746,650 B1 | 6/2004 | Lesieur |
| 6,881,308 B2 | 4/2005 | Denvir et al. |
| 7,314,544 B2 | 1/2008 | Murphy et al. |
| 8,038,957 B1 | 10/2011 | Cleary |
| 8,623,313 B2 | 1/2014 | Nakamura et al. |
| 8,789,586 B2 | 7/2014 | De et al. |
| 9,108,175 B2 | 8/2015 | Schwefer et al. |
| 9,108,858 B2 | 8/2015 | Mcdonald et al. |
| 9,217,068 B2 | 12/2015 | D'Souza et al. |
| 9,359,867 B2 | 6/2016 | Pennewitz et al. |
| 11,286,169 B2 | 3/2022 | Beach et al. |
| 11,325,105 B2 * | 5/2022 | Beach ............... B01J 23/34 |
| 2001/0018039 A1 | 8/2001 | Gam |
| 2002/0028171 A1 | 3/2002 | Goetsch et al. |
| 2003/0211026 A1 | 11/2003 | Moore |
| 2004/0039514 A1 | 2/2004 | Steichen et al. |
| 2005/0247050 A1 | 11/2005 | Kaboord et al. |

(Continued)

FOREIGN PATENT DOCUMENTS

| | | |
|---|---|---|
| CN | 2318593 Y | 5/1999 |
| CN | 103237599 A | 8/2013 |

(Continued)

OTHER PUBLICATIONS

US 8,585,996 B2, 11/2013, Nakamura et al. (withdrawn)
International Preliminary Report on Patentability for International (PCT) Patent Application No. PCT/US17/20201, dated Sep. 13, 2018, 10 pages.
International Preliminary Report on Patentability for International (PCT) Patent Application No. PCT/US18/32759, dated Aug. 1, 2018, 15 pages.
International Search Report and Written Opinion for International (PCT) Patent Application No. PCT/US17/20201, dated May 11, 2017, 10 pages.
International Search Report and Written Opinion for International (PCT) Patent Application No. PCT/US18/34637, dated Aug. 27, 2018, 9 pages.
"Comparative Quantitative Risk Analysis of Motor Gasoline, LPG, and Anhydrous Ammonia as an Automotive Fuel", Quest Consultants, Inc. Iowa State University, 59 pages., 2009.

(Continued)

*Primary Examiner* — Stuart L Hendrickson
(74) *Attorney, Agent, or Firm* — Holzer Patel Drennan

(57) ABSTRACT

This invention relates to a supported catalyst for synthesizing ammonia (NH₃) from nitrogen gas (N₂) and hydrogen gas (H₂), method of making the support, and methods of decorating the support with the catalyst.

11 Claims, 7 Drawing Sheets

(56) References Cited

U.S. PATENT DOCUMENTS

| | | |
|---|---|---|
| 2006/0039847 A1 | 2/2006 | Kaboord et al. |
| 2006/0204651 A1 | 9/2006 | Wai et al. |
| 2008/0193360 A1 | 8/2008 | Holbrook et al. |
| 2012/0308467 A1 | 12/2012 | Carpenter et al. |
| 2013/0183224 A1 | 7/2013 | Hosono et al. |
| 2013/0224476 A1 | 8/2013 | Zheng et al. |
| 2014/0140911 A1 | 5/2014 | Bergeal et al. |
| 2015/0184281 A1 | 7/2015 | Ito et al. |
| 2015/0217278 A1 | 8/2015 | Hosono et al. |
| 2015/0239747 A1 | 8/2015 | Hosono et al. |
| 2015/0353369 A1 | 12/2015 | Sekine et al. |
| 2016/0271595 A1 | 9/2016 | Chen et al. |
| 2017/0087537 A1 | 3/2017 | Zhang et al. |
| 2017/0088433 A1 | 3/2017 | Kageyama et al. |
| 2017/0253492 A1 | 9/2017 | Beach et al. |
| 2020/0248606 A1 | 8/2020 | Joo et al. |

FOREIGN PATENT DOCUMENTS

| | | |
|---|---|---|
| CN | 104445967 A | 3/2015 |
| EP | 1095906 A2 | 5/2001 |
| EP | 3415805 A1 | 12/2018 |
| JP | 2008013396 A | 1/2008 |
| WO | 1998040311 A1 | 9/1998 |
| WO | 2002016031 A2 | 2/2002 |
| WO | 2002047804 A1 | 6/2002 |
| WO | 2006099716 A1 | 9/2006 |
| WO | 2007104569 A1 | 9/2007 |
| WO | 2010114386 A1 | 10/2010 |
| WO | 2015177773 A1 | 11/2015 |
| WO | 2018213305 A1 | 11/2018 |
| WO | 2019104204 A1 | 5/2019 |
| WO | 2021168226 A1 | 8/2021 |

OTHER PUBLICATIONS

"KAAPtm Ammonia Synthesis Converter", https://web.archive.org/web/2011015180221/http://www.kbr.com/Technologies/Proprietary-Equipment/KAAP-Ammonia-Synthesis-Converter/, 2011.

"Targets for Onboard Hydrogen Storage Systems for Light-Duty Vehicles", U.S. Department of Energy Office of Energy Efficiency and Renewable Energy and The Freedom CAR and Fuel Partnership, 22 pages, Sep. 2009.

"Tracking Industrial Energy Efficiency and CO2 Emissions", International Energy Agency, 2007, 82-85.

Denholm , et al., "Grid Flexibility and storage required to achieve very high penetration of variable renewable electricity", Energy Policy, vol. 39(3), 2011, 1817-1830.

Frigo , et al., "Further Evolution of an Ammonia Fuelled Range Extender for Hybrid Vehicles", NH3 Fuel Conference, 23 pages, Sep. 21-21, 2014.

Giamello , "Heterogeneous Catalysis: Teaching an old material new tricks", Nature Chemistry, vol. 4(11), 2012, 869-870.

Haputhanthri, "Ammonia as an alternative transport fuel: Emulsifiers for gasoline ammonia fuel blends and real time engine performance", NH3 Fuel Conference, 24 pages, Sep. 22, 2014.

Inoue , et al., "Highly Dispered Ru on Electride [Ca24Al28O64]4+(e-)4 as a Catalyst for Ammonia Synthesis", ACS Catalysis, vol. 42(2), Abstract Only, 2014, 676.

Kaiser, "10 Billion Plus: Why World Population Projections Were Too Low", http://www.sciencemag.org/news/2011/05/10-billion-plus-why-world-population-projection-were-too-low, 2011.

Kitano , et al., "Ammonia Synthesis using a stable electride as an electron donor and reversible hydrogen store", Nature Chemistry, vol. 4, Abstract Only, 2012, 934-940.

Marnellos , et al., "Synthesis of ammonia at atmospheric pressure with the use of solid state proton conductors", Journal of Catalysis, vol. 193(1), Abstract Only, 2000, 80-87.

Matsuishi, et al., "High-density electron anions in a nanoporous single crystal: [Ca21 Al28 O64]4+(4e-)", Science, vol. 301(5633), 2003, 626-629.

Singh , et al., "KRES-ESTM Revamp Makes More Ammonia from Less Natural Gas by Energy Substitution", Session 4, Nitrogen & Syngas Conference, Feb. 21-24, Abstract Only, 2011.

Yiokari , et al., "High-pressure electrochemical promotion of ammonia sysnthesis over an industrial iron catalyst", Journal of Physical Chemistry A, vol. 104(46), Abstract Only, 2000, 10600-100602.

Kim, Sung-Wng , et al., "Fabrication of room temperature-stable 12CaO · 7Al2O3 electride: a review", Journal of Materials Science: Materials in Electronics, vol. 18, 2007, 5-14.

Search Report dated Apr. 28, 2023 in International Patent Application No. PCT/US2023/060785.

Search Report dated May 10, 2023 for International Patent Application No. PCT/US2023/063502.

Fertout, Radia Imane, et al., ""Nickel Supported on Alkaline Earth Metal-Doped γ—Al2O3—La2O3 as Catalysts for Dry Reforming of Methane"", Russian Journal of Applied Chemistry, 2020, vol. 93, No. 2, Abstract; Catalysts preparation, Feb. 2020, 289-298.

Jeong, Soyeon , et al., ""Sulfation and Desulfation Behavior of Pt—BaO/MgO—Al2O3 NOx Storage Reduction Catalyst"", Journal of nanoscience and nanotechnology, vol. 16, No. 5 (2016) 2.1 Catalyst Preparation, May 16, 2016, 4411-4416.

Li, Shuo , et al., ""Study on Catalytic Synthesis of Low Molecular Weight Polyether Polyol by Composite Alkaline Earth Metal"", IOP Conf. Series: Earth and Environmental Science 453 (2020) 012083 vol. 16, No. 5 (2016) 2.2. Preparation of Catalysts, 2020, 4411-4416.

* cited by examiner

METAL-DECORATED BARIUM CALCIUM ALUMINUM OXIDE AND RELATED MATERIALS FOR NH₃ CATALYSIS

CROSS REFERENCE TO RELATED APPLICATION

This application claims priority and the benefit under 35 U.S.C. § 119(e) to U.S. Provisional Patent Application Ser. No. 62/506,463, filed on May 15, 2017, and 62/590,570, filed on Nov. 25, 2017. Each of these applications are incorporated herein in their entirety by reference.

STATEMENT REGARDING FEDERALLY SPONSORED RESEARCH OR DEVELOPMENT

This invention was made with government support under grant number DE-AR0000685 awarded by the Department of Energy. The Government has certain rights in the invention.

FIELD OF THE INVENTION

This invention relates to a supported catalyst for synthesizing ammonia ($NH_3$) from nitrogen gas ($N_2$) and hydrogen gas ($H_2$), method of making the support, and methods of decorating the support with the catalyst.

BACKGROUND

The threat to continued economic development and security posed by climate change driven by anthropogenic emissions of carbon dioxide ($CO_2$) is well-known to those skilled in the art. To meet this threat, energy sources that are substantially free of $CO_2$ emissions are highly sought after in both the developed and developing worlds. While several $CO_2$-free energy generation options (e.g. wind, solar, hydroelectric, and nuclear power) have been extensively developed, none presently include a practicable $CO_2$-free fuel.

Ammonia ($NH_3$) can be burned as a fuel according to the following reaction equation (1):

$$4NH_3(g) + 3O_2 \rightarrow 2N_2 + 6H_2O(g) + \text{heat} \quad (1)$$

Thus, in principle, $NH_3$ can be used as a $CO_2$-free fuel, and/or as a hydrogen storage medium if thermally reformed into hydrogen and nitrogen gases. However, nearly all current $NH_3$ production processes utilize feedstocks and fuels that produce $CO_2$.

Prior efforts at sustainable fuel production have focused on biofuels, $H_2$, and "artificial photosynthesis." Although ethanol and biodiesel have higher energy density than $NH_3$, using food resources for fuel production results in higher food prices both by shifting the allocation of cropland from food to fuel and by raising the prices of the crops used for fuel production. This reallocation can cause political instability in developing countries due to higher food prices.

Hydrogen has never been able to overcome its storage density problems, although $NH_3$ can be regarded as a solution to $H_2$ storage. $NH_3$ has approximately twice the energy density of liquid hydrogen at easily achieved pressures and temperatures (about 9 atm at about 25° C.; about 1 atm at about −33° C.).

Although "artificial photosynthesis" could make a closed loop fuel cycle, it must extract $CO_2$ from the air to do so. Because nitrogen gas is much more abundant (79%) than $CO_2$ (0.04%) in the atmosphere, the use of $NH_3$ is a more viable route for a process of this type; synthesizing one mole of methane ($CH_4$) requires processing 3,550 times as much air as synthesizing one mole of $NH_3$. Commercial air separators for atmospheric $N_2$ extraction already exist and are well-known to those skilled in the art.

The main industrial procedure for the production of ammonia is the Haber-Bosch process, illustrated in the following reaction equation (2):

$$N_2(g) + 3H_2(g) \rightarrow 2NH_3(g)(\Delta H = -92.2 \text{ kJ/mol}) \quad (2)$$

The Haber-Bosch process requires approximately 31.4 gigajoules of energy, and as of 2005 produces approximately 2.1 tonnes of $CO_2$, per tonne of $NH_3$ produced. About two thirds of the $CO_2$ production derives from the steam reforming of hydrocarbons to produce hydrogen gas, while the remaining third derives from fuel combustion to provide energy to the synthesis plant. As of 2005, about 75% of Haber-Bosch $NH_3$ plants used natural gas as feed and fuel, while the remainder used coal or petroleum. As a result, Haber-Bosch $NH_3$ synthesis consumes between about 3% and about 5% of global natural gas production and between about 1% and about 2% of global energy production. It is thus desirable to provide improvements to methods for synthesizing ammonia that reduce the methods' reliance on $CO_2$-intensive fuels.

The Haber-Bosch reaction is generally carried out in a reactor containing an iron oxide or a ruthenium catalyst at a temperature between about 300° C. and about 550° C. and at a pressure between about 90 bar and about 180 bar. The elevated temperature is required to achieve a reasonable reaction rate. Due to the exothermic nature of $NH_3$ synthesis, the elevated temperature drives the equilibrium toward the reactants, but this is counteracted by the high pressure. In commercial production, waste heat from ammonia synthesis contributes to hydrogen production by steam reforming natural gas.

SUMMARY OF THE INVENTION

The ammonia formation reaction shown in Equation (2) proceeds slowly without the assistance of a catalyst. Metals known to catalyze the reaction include osmium (Os), ruthenium (Ru), and iron (Fe). The catalytic activity of these metals can be improved by adding "promoters" such as alkali metals. Promoters mentioned in the literature include potassium metal (K), potassium oxide ($K_2O$), cesium oxide ($Cs_2O$), cesium hydroxide (CsOH), calcium oxide (CaO), magnesium oxide (MgO), aluminum metal (Al), aluminum oxide ($Al_2O_3$), and beryllium oxide (BeO).

$NH_3$ catalyst activity may also be improved by applying the catalyst to the surface of certain "support materials." Decorating the surface of a support material with the catalyst has at least two advantages. First, high-dispersion deposition of catalyst particles on the support, i.e. deposition of particles with a size and shape that causes many catalyst molecules to be exposed to the reactants, allows more efficient use of the catalyst. Second, depending on the nature of the support, the support can also interact with the catalyst in a way that increases the catalyst's activity, for example by changing the catalyst's work function.

Support materials that have been mentioned for use with $NH_3$ catalysts in the literature include activated carbon, MgO, BeO, $Al_2O_3$, CaO, calcium amide ($Ca(NH_2)_2$), and C12A7:e− (mayenite electride in cement chemistry notation). U.S. Patent Application Ser. No. 62/8421,482, filed on Nov. 14, 2016 and Ser. No. 15/446,929, filed on Mar. 1, 2017, also describe the use of calcium aluminate materials including CA, C5A3, C3A (cement chemistry notation, C=CaO, A=Al$_2$O$_3$), and CaO in both their electrically insulating and their electrically conductive forms. These applications are incorporated herein by reference in their entirety.

The present invention provides an improved support material for NH$_3$ synthesis catalysts.

It is one aspect of the invention to provide a barium calcium aluminum oxide material to support Ru or other catalytic metals for the purpose of NH$_3$ synthesis.

It is an aspect of the invention to provide a barium calcium boron oxide material, to support Ru or other catalytic metals for the purpose of NH$_3$ synthesis.

It is an aspect of the invention to provide a barium calcium aluminum boron oxide material, to support Ru or other catalytic metals for the purpose of NH$_3$ synthesis.

It is an aspect of the invention is to provide a method for converting the support from an electrically insulating material into an electrically conducting material. The method involves annealing the electrically insulating material in a carbon monoxide (CO) atmosphere.

It is an aspect of the invention to provide a method for dispersing Ru or another catalytic metal from a solution onto the surface of the support.

It is an aspect of the invention to disperse the metal decorated support powder on the surface of a coarse material to make a high conductance catalyst bed. The coarse material can be a relatively inert material such as alumina grit, or it can be a catalytically active material such as a promoted iron NH$_3$ catalyst in granular form.

It is an aspect of the invention to form the metal decorated support powder into a granule, pellet, or other shaped object.

It is an aspect of the invention to form the support powder into a granule, pellet, or other shaped object and then decorate it with a catalytic metal.

It is an aspect of the invention to adhere the metal decorated support powder onto mechanical support such as grit, a pellet, a screen, honeycomb, or sheet.

It is an aspect of the invention to adhere the support powder onto mechanical support such as a screen, a pellet, honeycomb, or sheet and then decorate it with a catalytic metal.

An aspect of the invention is an ammonia catalyst comprising a barium calcium aluminum oxide support material decorated with a catalytic metal. The catalyst support material can include at least one dopant. The dopant can be magnesium, strontium, gallium, boron, indium, or combinations thereof. The ammonia catalyst support material can include greater than about 0 wt. % and less than or equal to about 100 wt. % of at least one dopant. The catalyst support material can have at least a portion of at least one of a barium component or a calcium component of the barium calcium aluminum oxide support material comprises at least one of magnesium or strontium component. The catalyst support material can have at least a portion of an aluminum component comprises at least one of indium, gallium, or boron component. In some embodiments, the barium, calcium or aluminum of the ammonia catalyst can include greater than about 0 wt. % and less than or equal to about 100 wt. % of magnesium, strontium, gallium, indium, or boron. The magnesium, strontium, gallium, indium, or boron can be magnesium oxide, strontium oxide, gallium oxide, indium oxide, or boron oxide, or combinations thereof.

The catalytic metal can be at least one of a Ti, a V, a Cr, a Mn, a Fe, a Co, a Ni, a Cu, a Mo, a Ru, a Rh, a Pd, or an Os. In some embodiments, the catalytic metal can be the Ru. The catalyst dispersion can be between about 0.1% and about 90%. In some embodiments, the catalytic metal can Ru and include about 1 wt. % of the catalytic metal.

The barium calcium aluminum oxide support or substituted barium calcium aluminum oxide can be a powder, a granule, a pellet, or a tablet. In some embodiments, the catalyst-decorated support material can be dispersed on at least a portion of a secondary material. The secondary material can be granules, grit, a pellet, a screen, honeycomb, or sheet.

The formula of the catalyst can be at least one of B7C2A3, barium calcium boron oxide, BA, B2CA, or can be substituted form of these formulas. The barium calcium aluminum oxide support or substituted barium calcium aluminum oxide support can be electrically insulating or electrically conductive.

An aspect of the invention is a method to produce a catalyst support material. The method includes combining at least one barium contributor, at least one calcium contributor, and at least one aluminum contributor (or a boron contributor) at a ratio of between about 1 and about 10 of the barium contributor: between about 1 and about 10 of the calcium contributor: between about 1 and about 10 of the aluminum contributor (or boron contributor) to form a first mixture. The first mixture is comminuted to form a comminuted mixture. The comminuted mixture is mixed with a solvent to form a slurry or a paste. The slurry or paste is dried to form a second mixture. The second mixture is annealed to form the catalyst support material.

In some embodiments, the barium contributor can be at least one of a barium carbonate, a barium hydroxide, a barium hydroxide hydrate, a barium nitrate, a barium oxide, or a barium isopropoxide. The calcium contributor can be at least one of a calcium carbonate, a calcium hydroxide, a calcium hydroxide hydrate, a calcium oxide, or a calcium methoxide. When used, the aluminum contributor can be at least one of an aluminum oxide, or an aluminum isopropoxide. When used, the boron contributor can be at least one of a boron oxide or a boric acid. The catalyst support material can be at least one of a powder, grit, a pellet, a screen, honeycomb, or sheet. The surface area of the comminuted mixture can be between about 0.5 and about 25 m$^2$ g$^{-1}$. Comminuting can occur in the presence of the solvent or can be mixed with a solvent after comminuting. The solvent can be an anhydrous solvent, such as methyl alcohol, pentane, toluene, heptane, acetone, chloroform, hexane, or combinations thereof. The ratio of the comminuted mixture to the solvent can be between about 1 and about 10 powder to between about 1 and about 10 solvent. The drying temperature can be between about 0° C. and about 300° C. In some embodiments, the drying temperature can be about 25° C. The annealing pressure can be between about 300.1 bar and about 10 bar. The annealing environment can include at least one gas comprising air, nitrogen, oxygen, argon, or helium. The annealing environment can include nitrogen and oxygen gases in some embodiments, where a ratio of the nitrogen gas to the oxygen gas can be between about 1 and about 10 nitrogen gas: between about 1 and about 10 oxygen gas. The annealing temperature can be greater than about 1000° C. and less than about 1450° C. The ramp rate to reach the annealing temperature can be about 5° C./minute. The dwell time or annealing time can be between about 1 minutes and about 12 hours. The annealing environment can include between about 5 vol. % and about 100% of at least one reducing gas. The reducing gas can be carbon monoxide. In some embodiments, the catalyst support material can be comminuted. The catalyst support material can be mixed with a second solvent to form a slurry or a paste. The second solvent can be at least one of methyl alcohol, pentane, toluene, heptane, acetone, chloroform, or hexane. The ratio of comminuted support material to solvent can be between about 1 and about 10 of the comminuted support material to between about 1 and about 10 of the second solvent. The slurry or paste can be dried at a temperature between about 0° C. and about 300° C.

In some embodiments, at least one dopant can be included in the first mixture. The dopant can be strontium, magnesium, indium, boron, aluminum or gallium. In some embodiments, between about 0 wt. % and about 100 wt. % of the aluminum contributor (or boron contributor) can be replaced with an additional contributor. The additional contributor can be at least one of $Ga_2O_3$, $In_2O_3$, $B_2O_3$, or aluminum oxide. In some embodiments, the catalyst support material can be of the formula B7C2A3, barium calcium boron oxide, BA, or B2CA, or can be substituted as explained herewith.

DETAILED DESCRIPTION OF THE INVENTION

Figure 1:
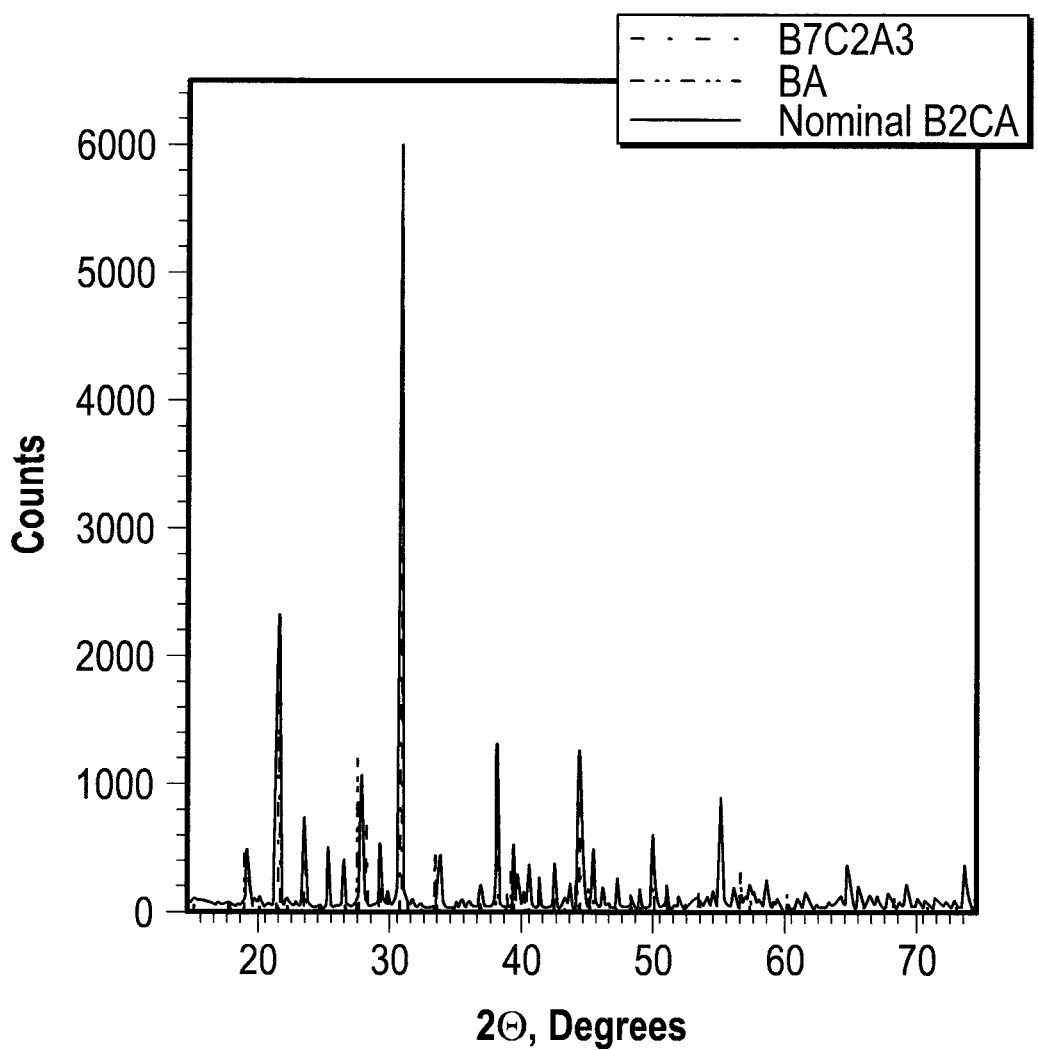
FIG. 1 illustrates an x-ray diffraction pattern from a nominal B2CA $((BaO)_2(CaO)(Al_2O_3)$, barium calcium aluminum oxide) material. It shows that the material is actually a mixture of B7C2A3 $((BaO)_7(CaO)_2(Al_2O_3)_3)$ and BA $((BaO)(Al_2O_3))$ phases.

The present invention is directed to a ceramic supported catalyst, and the materials used therein, and method of using the supported catalyst to produce $NH_3$. Methods for making the ceramic support and ceramic supported catalyst are also provided.

As used herein "BCA" means a barium calcium aluminum oxide material. When the formula B#C#A# is used, cement chemistry notation is being used. In that notation, B=BaO, C=CaO, A=$Al_2O_3$, and the number following each material denotes the number of those chemical units in the material's stoichiometric composition. Thus, B7C2A3 indicates $(BaO)_7(CaO)_2(Al_2O_3)_3$, or $Ba_7Ca_2Al_6O_{18}$. Similarly, "BA" means $(BaO)(CaO)$, or $BaCaO_2$.

Synthesis of Catalyst Support Material

Barium calcium aluminum oxide ("BCA") is not a commonly synthesized material. Calcium aluminates are commonly synthesized materials used for making cement. Barium aluminates are also synthesized for some applications, such as oxygen getters and refractory cements, but are less common.

The present invention is directed to a scalable method for producing barium calcium aluminum oxide powder. A barium contributor, a calcium contributor and an aluminum contributor are combined to produce a barium calcium aluminum oxide powder. Suitable barium contributors can include barium carbonate, barium hydroxide, barium hydroxide hydrate, barium nitrate, barium oxide, barium isopropoxide, and combinations thereof. Suitable calcium contributors can include calcium carbonate, calcium hydroxide, calcium hydroxide hydrate, calcium oxide, calcium methoxide, and combinations thereof. Suitable aluminum contributors can include aluminum oxide, aluminum isopropoxide and combinations thereof. The barium contributor, the calcium contributor and/or the aluminum contributor can be in the form of a powder, solutions, or combinations thereof. The barium contributor, the calcium contributor and the aluminum contributor can be combined at different molar ratios to form a powder. The molar ratio can be between about 1 and about 10 barium contributor: between about 1 and about 10 calcium contributor: between about 1 and about 10 aluminum contributor. By way of example only, the molar ratio of the materials can be 2.0 $BaCO_3$:1.0 $CaCO_3$:1.0 $Al_2O_3$. Other molar ratios with other barium, calcium, or aluminum contributor can be utilized without deviating from the invention. Different molar ratios of the barium contributor: the calcium contributor: the aluminum contributor reactants can be used to produce different stoichiometry barium calcium aluminum oxide materials or multi-phase mixtures. Multi-phase mixtures can include barium calcium aluminum oxide, barium aluminum oxide, calcium aluminum oxide, barium oxide, calcium oxide, and aluminum oxide. The powder can also include combinations of different mixtures, for example, more than one calcium contributor. The powder can also include incidental materials. The ratio, and ultimately the end product, can be determined based on the end use of the support and catalyst. One skilled in the art can determine the best end product, and therefore the best ratio for a particular support and catalyst by measuring the $NH_3$ synthesis performance of the BCA material decorated with ruthenium to determine the highest ammonia synthesis rate. In some embodiments, materials with a high B7C2A3, or $(BaO)_7(CaO)_2(Al_2O_3)_3$, content can produce the highest $NH_3$ synthesis rates.

The contributor materials can be comminuted using any suitable method, including grinding beads, hammer mills, roller mills, or combinations thereof. The comminuted material can be comminuted in the presence of a solvent or mixed with the solvent after comminuting to form a slurry or paste. The solvent can be an anhydrous solvent, for example methyl alcohol, pentane, toluene, heptane, acetone, chloroform, hexane, and combinations thereof. In some embodiments, the volume ratio of the powder mixture to the solvent can be between about 1 and about 10 powder to between about 1 and about 10 solvent. The slurry or paste can be mixed using suitable means, including ball milling, roller milling, auger mixing, paddle mixing, or combinations thereof. The slurry or paste can be dried to remove the solvent. Drying can occur at room temperature, or can occur at a temperature of between about 0° C. and about 300° C., which can depend on the solvent evaporation pressure and temperature. The solvent can have a vapor pressure that is low enough to work with to form the slurry or paste, but high enough that it evaporates quickly during the drying steps. The mixed dried powder can be filtered or sieved to remove large particles (i.e. particles exceeding about 25 microns) and any grinding materials used to mix or comminute the powder.

The mixed dry powder can be annealed. When a non-oxide material is used as the barium contributor, the calcium contributor, or the aluminum contributor, the non-oxide materials can decompose to BaO or CaO or $Al_2O_3$ at elevated temperatures. The annealing profile can be adjusted to give the reactants time to decompose to the oxide form prior to heating to the solid-state reaction temperature for the barium calcium aluminum oxide synthesis. Care should be taken with hydroxide and hydrated reactants to ensure that the water evolved from the reactants does not condense in portions of the furnace where it could cause damage. The annealing can be continuous or batch. The annealing pressure can be between about 0.1 bar and about 10 bar. In some embodiments, the annealing can occur at an ambient pressure. The annealing environment can be air, pure nitrogen, pure oxygen, in an inert environment (e.g. argon, helium, nitrogen, other gases that do not react with the contributor materials more readily than oxygen does) or combinations thereof. In some embodiments, the environment can be a $N_2:O_2$ atmosphere where the ratio of nitrogen gas to oxygen gas is between about 1 and about 10 nitrogen gas: between about 1 and about 10 oxygen gas. In some embodiments, the ratio of nitrogen gas to oxygen gas can be about 1:1. The gas flow rate is specific to the particular annealing equipment, batch size, and contributor materials that are used. The appropriate flow rate for a particular setup can be determined by those skilled in the art. For example, the flow rate of the gas through a 3" internal diameter tube furnace containing 1-500 g carbonate contributors can be about 500 sccm total flow. The gases do not participate in the net barium calcium aluminum oxide synthesis reaction; rather, they sweep away $CO_2$ that is evolved during the carbonate reactant calcination or the other gases that are evolved during the decomposition of other contributor materials (for example, water evolved from hydroxides or hydrates).

The anneal procedure can be performed at a ramp rate greater than about 0° C./minute up to about 600° C./minute, in some embodiments a rate of an approximately 5° C./min ramp. The maximum ramp rate can be determined by a combination of equipment robustness and rate of evolution of gases from the contributor materials. Ramping materials that evolve water too fast can break equipment if it condenses certain locations on the equipment. Those skilled in the art would understand to consider these variables in determining a suitable ramp rate. The temperature can be increased to an annealing temperature of between about 1000° C. and about 1450° C. The temperature should not exceed about 1450° C. as that temperature approaches the melting temperature of the mixed dried powder. In some embodiments, the annealing temperature can be about 1200-1300° C. The mixed dried powder can be maintained at the annealing temperature for between about 1 minute and about 12 hours, in some embodiments about 6 hours. In some embodiments, the annealing dwell can be between about 1 hour and about 7 hours. In some embodiments, the annealing can include successive dwells at interim temperatures until the final dwelling temperature is reached. The annealing time can also depend upon the amount of powder being annealed. For example, if the end temperature is about 900° C., the annealing process can include a dwell at about 150° C., then about 300° C., then about 500° C., and so on until the final temperature of about 900° C. is reached. The support can be maintained at the interim temperature for between greater than 0 minutes and about 15 hours, and the dwell time can be the same at each temperature or can be different. In some embodiments, the dwell at an interim temperature can be between about 1 hour and about 6 hours. The powder can be returned to room temperature or a practical handling temperature as quickly as the equipment will allow. Rapid cooling will not harm the powder, so the cooling rate is dictated by equipment capabilities and other practical considerations known to those skilled in the art. In some embodiments, the cooling rate to about 25° C. can be approximately 5° C./min. The ramp rate can be limited by the furnace's natural cooling rate. Lower annealing temperatures can be used if the annealing time is adjusted to ensure that the solid-state reaction proceeds to completion. However, the solid state diffusion required for the barium calcium aluminum oxide formation is a thermally activated process, so required annealing times increase nonlinearly as the temperature is reduced. Faster ramp rates are possible with appropriate equipment, although the ramp rate may be constrained by the need for carbon dioxide, water, or other gases evolved from the reactants to diffuse out of the powders. Elevated carbon dioxide partial pressures over carbonate contributor materials increases the temperature required for calcination to occur. Elevated water partial pressures in the furnace can cause water condensation in cooler portions of the furnace, possibly causing equipment damage.

The annealed material can be an electrically insulating powder. The annealed material can be white or blue-tinted white in color. Material that is blue-tinted white when it is removed from the furnace changes to white after about an hour in room air. While not wanting to be bound by theory, this color may be due to small amounts of water or carbon dioxide entering the lattice as a dopant at concentrations too small to affect crystalline properties but sufficient to slightly change optical properties. The structure of the annealed powder can be examined by x-ray diffraction. FIG. 1 illustrates an x-ray diffraction pattern for the annealed powder. The peaks in the measured pattern are explained as the superposition of the peaks for BA and B7C2A3 phases, in which B=BaO, C=CaO, and $A=Al_2O_3$. This notation is common in cement chemistry. It should be noted that the x-ray diffraction pattern for B7C2A3 was only calculated up to $2\Theta=52°$. The unmarked prominent peaks at angles higher than $2\Theta=52°$ are likely due to B7C2A3, but are not marked due to a lack of calculated data in that region. The B7C2A3 pattern has the same form as the x-ray diffraction pattern of B3A (stoichiometrically equivalent to B9A3), but the line placements are shifted due to CaO substituting for 2/9 of the BaO.

The annealed material can be made to be electrically conductive by annealing in a reducing gas, such as carbon monoxide. Advantageously, the powder retains its crystal structure following annealing in the presence of the reducing gas. Annealing at between about 5 vol. % and about 100% of the reducing gas for between about 0.1 hours and about 30 hours, in some embodiments about 15 hour, at an annealing temperature of between about 600° C. and about 1100° C., in some embodiments about 900° C. can cause the powder (between at least about 95% and about 100%, in some embodiments 100%) to be electrically conductive powder. Lower conductivity can be induced by annealing at the lower temperatures and/or the lower times. Additional information about this annealing process can be found in U.S. Patent Publication No. 2017/0253492 (application Ser. No. 15/446,929), filed on Mar. 1, 2017, which is incorporated by reference in its entirety.

The annealed powder can be comminuted to reduce the particle size of the powder and granules, and increase its surface area. The annealed powder can be comminuted using any suitable method, including milling, grinding, crushing, and combinations thereof. Multiple comminuting steps can occur. In some embodiments, the comminuting steps can occur after a powder has been cooled between multiple comminuting steps. The comminuted powder, which can be agglomerated, can have a surface area between about 0.5 and about 25 m² g⁻¹. The annealed powder can be combined with a solvent to form a slurry or paste, either during comminution or after comminution. The amount of the annealed powder and the solvent can vary, but are sufficient to make a slurry or paste. The solvent can be an anhydrous solvent, for example methyl alcohol, pentane, toluene, heptane, acetone, chloroform, hexane, and combinations thereof. In some embodiments, the volume ratio of the powder mixture to the solvent can be between about 1 and about 10 powder to between about 1 and about 10 solvent. The solvent can be allowed to evaporate or dry. Drying can occur at room temperature, or can occur at a temperature of between about 0° C. and about 300° C., depending on the evaporation temperature and pressure of the solvent. For example, the solvent can have a vapor pressure that is low enough to work with to form the slurry or paste, but high enough that it evaporates quickly during the drying steps. The dried powder (either conductive or insulating) can be sieved to remove large particles (i.e. particles exceeding about 25 microns) and any grinding materials used to mix or comminute the powder.

Dopants can be included in the powder. Suitable dopants can include, strontium, magnesium, gallium, indium, boron, and combinations thereof. The dopants can be introduced to the powder as pure elements or as contributor compounds such as strontium oxide, magnesium oxide, gallium oxide, indium oxide, boron oxide, or boric acid. The portion of the powder components (barium contributor, calcium contributor, and aluminum contributor) that can be replaced by the dopant is between about 0% and about 100% on a metal atom basis. In some embodiments, materials with the same crystalline structure, but different lattice constants, can be made by replacing portions of the barium contribution and calcium contribution with strontium and/or magnesium dopant or by replacing portions of the aluminum contribution with $Ga_2O_3$, $In_2O_3$, $B2O_3$, boric acid or combinations thereof Synthesis of Barium Calcium Boron Oxide Catalyst Support Material A substituted barium calcium aluminum oxide material is an aspect of the invention. Several materials can be substituted with at least a portion of the aluminum oxide, including boron oxide, $Ga_2O_3$, $In_2O_3$, boric acid, or combinations thereof. While the substitution with boric acid is discussed in great detail, one skilled in the art would understand that a different material can be substituted for at least a portion of the aluminum oxide without deviating from the present invention.

Figure 2:
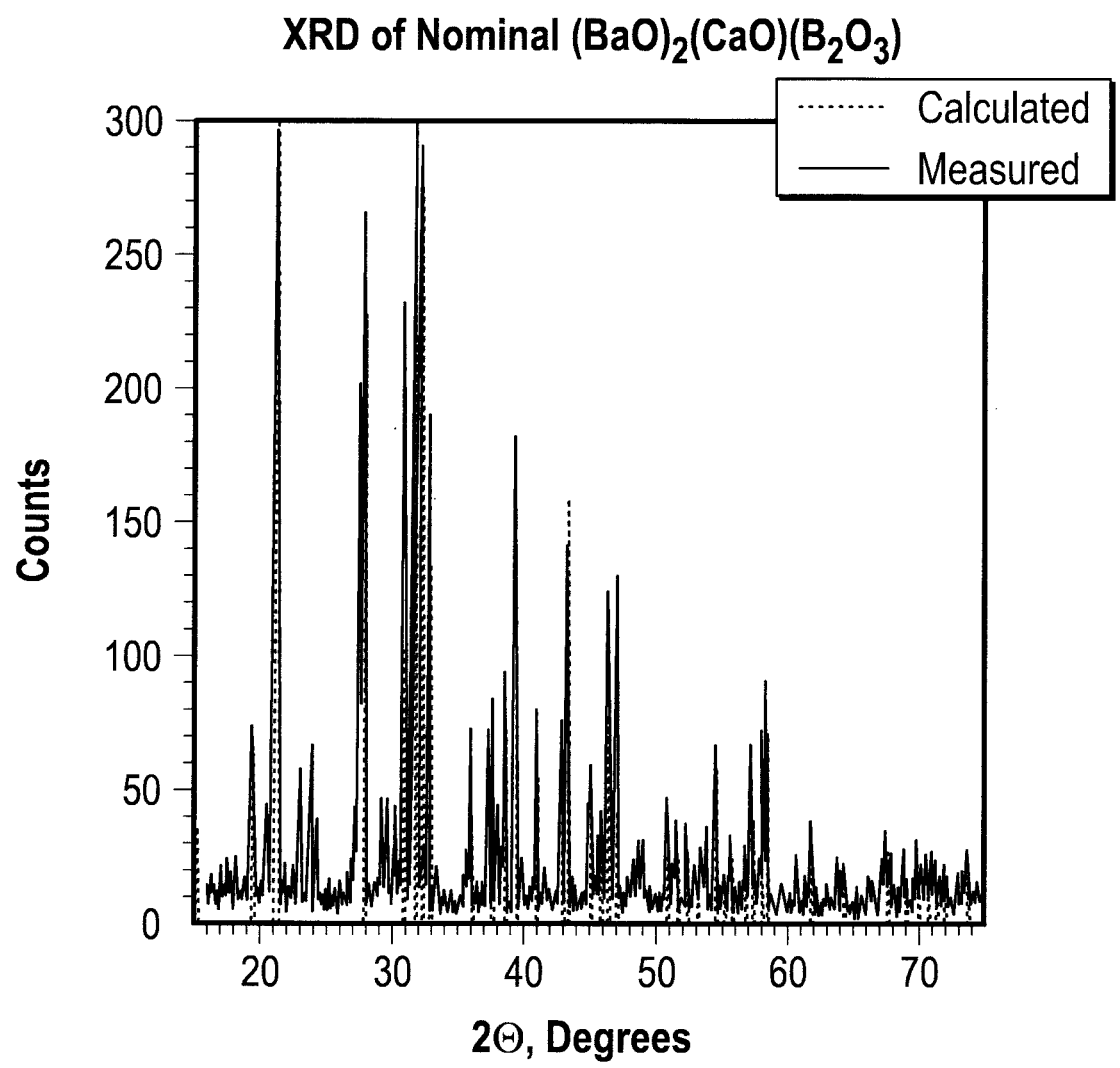
FIG. 2 illustrates an x-ray diffraction pattern of the barium calcium boron oxide material. It shows that the material is primarily $(BaO)_2(CaO)(B_2O_3)$

Barium calcium boron oxide can be prepared by the method described for barium calcium aluminum oxide, but boric acid can be substituted for the $Al_2O_3$. The x-ray diffraction pattern for the resulting powder is illustrated in FIG. 2. It indicates the powder is predominantly $(BaO)_2(CaO)(B_2O_3)$ (calculated peaks marked). The peaks that are not identified as $(BaO)_2(CaO)(B_2O_3)$ can be mostly attributed to small amounts of CaO.

A barium calcium aluminum boron oxide compound can be synthesized by the method described for barium calcium aluminum oxide by substituting boric acid for only a portion of the $Al_2O_3$.

A barium contributor, a calcium contributor and an boron contributor are combined to produce a barium calcium boron oxide powder. Suitable barium contributors can include barium carbonate, barium hydroxide, barium hydroxide hydrate, barium nitrate, barium oxide, barium isopropoxide, and combinations thereof. Suitable calcium contributors can include calcium carbonate, calcium hydroxide, calcium hydroxide hydrate, calcium oxide, calcium methoxide, and combinations thereof. Suitable boron contributors can include boron oxide, boric acid, and combinations thereof. The barium contributor, the calcium contributor and/or the boron contributor can be in the form of a powder, solutions, or combinations thereof. The barium contributor, the calcium contributor and the boron contributor can be combined at different molar ratios to form a powder. The molar ratio can be between about 1 and about 10 barium contributor: between about 1 and about 10 calcium contributor: between about 1 and about 10 boron contributor. By way of example only, the molar ratio of the materials can be 2.0 $BaCO_3$: 1.0$CaCO_3$:1.0$B2O_3$. Other molar ratios with other barium, calcium, or boron contributor can be utilized without deviating from the invention. Different molar ratios of the barium contributor:the calcium contributor:the boron contributor reactants can be used to produce different stoichiometry barium calcium boron oxide materials or multi-phase mixtures. Multi-phase mixtures can include barium calcium boron oxide, barium boron oxide, boron calcium oxide, barium oxide, calcium oxide, and boron oxide. The powder can also include combinations of different mixtures, for example, more than one calcium contributor. The powder can also include incidental materials. The ratio, and ultimately the end product, can be determined based on the end use of the support and catalyst. One skilled in the art can determine the best end product, and therefore the best ratio for a particular support and catalyst by measuring the $NH_3$ synthesis performance of the barium calcium boron oxide material decorated with ruthenium to determine the highest ammonia synthesis rate. In some embodiments, materials with a high $(BaO)_7(CaO)_2(B_2O_3)_3$, content can produce the highest $NH_3$ synthesis rates.

The contributor materials can be comminuted using any suitable method, including grinding beads, hammer mills, roller mills, or combinations thereof. The comminuted material can be comminuted in the presence of a solvent or mixed with the solvent after comminuting to form a slurry or paste. The solvent can be an anhydrous solvent, for example methyl alcohol, pentane, toluene, heptane, acetone, chloroform, hexane, and combinations thereof. In some embodiments, the volume ratio of the powder mixture to the solvent can be between about 1 and about 10 powder to between about 1 and about 10 solvent. The slurry or paste can be mixed using suitable means, including ball milling, roller milling, auger mixing, paddle mixing, or combinations thereof. The slurry or paste can be dried to remove the solvent. Drying can occur at room temperature, or can occur at a temperature of between about 0° C. and about 300° C., which can depend on the solvent evaporation pressure and temperature. The solvent can have a vapor pressure that is low enough to work with to form the slurry or paste, but high enough that it evaporates quickly during the drying steps. The mixed dried powder can be filtered or sieved to remove large particles (i.e. particles exceeding about 25 microns) and any grinding materials used to mix or comminute the powder.

The mixed dry powder can be annealed. When a non-oxide material is used as the barium contributor, the calcium contributor, or the boron contributor, the non-oxide materials can decompose to BaO or CaO or $B_2O_3$ at elevated temperatures. The annealing profile can be adjusted to give the reactants time to decompose to the oxide form prior to heating to the solid-state reaction temperature for the barium calcium boron oxide synthesis. Care should be taken with hydroxide and hydrated reactants to ensure that the water evolved from the reactants does not condense in portions of the furnace where it could cause damage. The annealing can be continuous or batch. The annealing pressure can be between about 0.1 bar and about 10 bar. In some embodiments, the annealing can occur at an ambient pressure. The annealing environment can be air, pure nitrogen, pure oxygen, in an inert environment (e.g. argon, helium, nitrogen, other gases that do not react with the contributor materials more readily than oxygen does) or combinations thereof. In some embodiments, the environment can be a $N_2:O_2$ atmosphere where the ratio of nitrogen gas to oxygen gas is between about 1 and about 10 nitrogen gas: between about 1 and about 10 oxygen gas. In some embodiments, the ratio of nitrogen gas to oxygen gas can be about 1:1. The gas flow rate is specific to the particular annealing equipment, batch size, and contributor materials that are used. The appropriate flow rate for a particular setup can be determined by those skilled in the art. For example, the flow rate of the gas through a 3" internal diameter tube furnace containing 1-500 g carbonate contributors can be about 500 sccm total flow. The gases do not participate in the net barium calcium aluminum oxide synthesis reaction; rather, they sweep away $CO_2$ that is evolved during the carbonate reactant calcination or the other gases that are evolved during the decomposition of other contributor materials (for example, water evolved from hydroxides or hydrates).

The anneal procedure can be performed at a ramp rate greater than about 0° C./minute up to about 600° C./minute, in some embodiments a rate of an approximately 5° C./min ramp. The maximum ramp rate can be determined by a combination of equipment robustness and rate of evolution of gases from the contributor materials. Ramping materials that evolve water too fast can break equipment if it condenses certain locations on the equipment. Those skilled in the art would understand to consider these variables in determining a suitable ramp rate. The temperature can be increased to an annealing temperature of between about 1000° C. and about 1450° C. The temperature should not exceed about 1450° C. as that temperature approaches the melting temperature of the mixed dried powder. In some embodiments, the annealing temperature can be about 1200-1300° C. The mixed dried powder can be maintained at the annealing temperature for between about 1 minute and about 12 hours, in some embodiments about 6 hours. In some embodiments, the annealing dwell can be between about 1 hour and about 7 hours. In some embodiments, the annealing can include successive dwells at interim temperatures until the final dwelling temperature is reached. The annealing time can also depend upon the amount of powder being annealed. For example, if the end temperature is about 900° C., the annealing process can include a dwell at about 150° C., then about 300° C., then about 500° C., and so on until the final temperature of about 900° C. is reached. The support can be maintained at the interim temperature for between greater than 0 minutes and about 15 hours, and the dwell time can be the same at each temperature or can be different. In some embodiments, the dwell at an interim temperature can be between about 1 hour and about 6 hours. The powder can be returned to room temperature or a practical handling temperature as quickly as the equipment will allow. Rapid cooling will not harm the powder, so the cooling rate is dictated by equipment capabilities and other practical considerations known to those skilled in the art. In some embodiments, the cooling rate to about 25° C. can be approximately 5° C./min. The ramp rate can be limited by the furnace's natural cooling rate. Lower annealing temperatures can be used if the annealing time is adjusted to ensure that the solid-state reaction proceeds to completion. However, the solid state diffusion required for the barium calcium aluminum oxide formation is a thermally activated process, so required annealing times increase nonlinearly as the temperature is reduced. Faster ramp rates are possible with appropriate equipment, although the ramp rate may be constrained by the need for carbon dioxide, water, or other gases evolved from the reactants to diffuse out of the powders. Elevated carbon dioxide partial pressures over carbonate contributor materials increases the temperature required for calcination to occur. Elevated water partial pressures in the furnace can cause water condensation in cooler portions of the furnace, possibly causing equipment damage.

The annealed material can be an electrically insulating powder. The annealed material can be white or blue-tinted white in color. Material that is blue-tinted white when it is removed from the furnace changes to white after about an hour in room air. While not wanting to be bound by theory, this color may be due to small amounts of water or carbon dioxide entering the lattice as a dopant at concentrations too small to affect crystalline properties but sufficient to slightly change optical properties. The structure of the annealed powder can be examined by x-ray diffraction.

The annealed material can be made to be electrically conductive by annealing in a reducing gas, such as carbon monoxide. Advantageously, the powder retains its crystal structure following annealing in the presence of the reducing gas. Annealing at between about 5 vol. % and about 100% of the reducing gas for between about 0.1 hours and about 30 hours, in some embodiments about 15 hour, at an annealing temperature of between about 600° C. and about 1100° C., in some embodiments about 900° C. can cause the powder (between at least about 95% and about 100%, in some embodiments 100%) to be electrically conductive powder. Lower conductivity can be induced by annealing at the lower temperatures and/or the lower times. Additional information about this annealing process can be found in U.S. Patent Publication No. 2017/0253492 (application Ser. No. 15/446,929), filed on Mar. 1, 2017, which is incorporated by reference in its entirety.

The annealed powder can be comminuted to reduce the particle size of the powder Sand granules, and increase its surface area. The annealed powder can be comminuted using any suitable method, including milling, grinding, crushing, and combinations thereof. Multiple comminuting steps can occur. In some embodiments, the comminuting steps can occur after a powder has been cooled between multiple comminuting steps. The comminuted powder, which can be agglomerated, can have a surface area between about 100.5 and about 25 $m^2 \ g^{-1}$. The annealed powder can be combined with a solvent to form a slurry or paste, either during comminution or after comminution. The amount of the annealed powder and the solvent can vary, but are sufficient to make a slurry or paste. The solvent can be an anhydrous solvent, for example methyl alcohol, pentane, toluene, heptane, acetone, chloroform, hexane, and combinations thereof. In some embodiments, the volume ratio of the powder mixture to the solvent can be between about 1 and about 10 powder to between about 1 and about 10 solvent. The solvent can be allowed to evaporate or dry. Drying can occur at room temperature, or can occur at a temperature of between about 0° C. and about 300° C., depending on the evaporation temperature and pressure of the solvent. For example, the solvent can have a vapor pressure that is low enough to work with to form the slurry or paste, but high enough that it evaporates quickly during the drying steps. The dried powder (either conductive or insulating) can be sieved to remove large particles (i.e. particles exceeding about 25 microns) and any grinding materials used to mix or comminute the powder.

Dopants can be included in the powder. Suitable dopants can include, strontium, magnesium, gallium, indium, aluminum, and combinations thereof. The dopants can be introduced to the powder as pure elements or as contributor compounds such as strontium oxide, magnesium oxide, gallium oxide, indium oxide, or aluminum oxide. The portion of the powder components (barium contributor, calcium contributor, and boron contributor) that can be replaced by the dopant is between about 0% and about 100% on a metal atom basis. In some embodiments, materials with the same crystalline structure, but different lattice constants, can be made by replacing portions of the barium contribution and calcium contribution with strontium and/or magnesium dopant or by replacing portions of the boron contribution with $Ga_2O_3$, $In_2O_3$, $Al_2O_3$, or combinations thereof.

Method to Decorate Support Materials with Catalytic Metal

An aspect of the present invention is a method to decorate a support material, and the resulting decorated support. The present invention can utilize an incipient wetness technique, a ball milling technique, or a wet impregnation technique to decorate the support materials with a catalytic metal material. The incipient wetness and ball milling methods were described in U.S. patent application Ser. No. 15/446,929, filed on Mar. 1, 2017, which is incorporated by reference in its entirety.

The support materials can be in several forms. For example, the support material can be a loose powder, powder dispersed on alumina grit, powder adhered to a mechanical support, or powder pressed into pellets using a press (for example, a tablet press). The support can be a granule, which can be made by first making pellets and then crushing and sieving them.

The support materials and the methods to make the support materials of the present invention have been described in great detail and can include various forms of BCA or a substituted BCA material.

A catalyst metal can decorate the support (i.e. be applied to the surface of the support). The catalyst can include, but is not limited to, a metal oxide, a metal nitride (cobalt molybdenum nitride, for example), a metal (including promoted iron), an alkali promoted catalyst, and combinations thereof. In some embodiments, the catalyst can be a metal oxide, such as an iron oxide. In some embodiments, the catalyst can contain a metal, for example any Group VIII metal, such as ruthenium, iron, osmium, nickel, palladium, platinum or combinations thereof. In some embodiments, the catalyst can be an alkali promoted metal oxide catalyst, for example an iron oxide potassium oxide catalyst. In some embodiments, the catalyst can be an alkali promoted metal catalyst, for example Cs promoted Ru metal. A "promoted" catalyst refers to a catalyst to which another material has been added that results in the catalyst having a higher activity. In the case of $NH_3$ catalysts, alkali metals (Cs, K, Na, etc.) in elemental or compound form are often added to the catalyst, for example Ru or Fe, to increase the Ru or Fe activity. Typically, the alkali metals do not do not catalyze $NH_3$ synthesis on their own; rather these metals optimize Fe and Ru.

Incipient Wetness Technique

An aspect of the present invention is a method to decorate a support material, and the resulting decorated support.

Incipient wetness is a common decoration method in which a metal compound is dissolved in a solvent to form a solution, the support powder is wet with that solution, the solvent is allowed to evaporate from the support powder, and then the remaining dispersed metal compound is converted to metal by an appropriate anneal known by those skilled in the art. For example, Ru carbonyl can be converted to Ru or Ru oxide by annealing in steps up to about 250° C. in either an inert or oxygen-containing atmosphere. $RuCl_3$ hydrate can be converted to Ru oxide or Ru metal in a similar way by annealing at 5450° C.

The solvent used with the method to decorate the support material will depend upon the material being dissolved in the solvent. Thus, a comprehensive list of solvents is not possible. However, it is optimal that the material to be dissolved will be highly soluble in the solvent, and the solvent will evaporate quickly under the process conditions. Furthermore, the temperature and the atmosphere can be varied to achieve the desired results. In some embodiments, the decoration process can be performed at room temperature and the solvent can be a non-aqueous solvent (since these materials will hydrate or change phase when an aqueous solution is used). In general, non-aqueous solvents can typically be used with metal-organic compounds, while salts of the desired metal that have high solubility in water can typically utilize aqueous solvents. In either case, however, the solvent must also be compatible with the support material. The support powders are all cement-formers, and thus are altered by water. Thus, a non-aqueous solvent must be used for incipient wetness Ru decoration. Ru carbonyl and $RuCl_3$ are not strongly soluble in organic solvents, which increases the amount of solvent that must be used and evaporated.

An amount of catalyst compound that will yield the desired wt % catalytic metal for the amount of support material to be processed can be dissolved in the solvent. The amount of solvent used can be at least enough to fully dissolve the catalyst compound. The amount of solvent used can be greater than the minimum required to dissolve the catalyst compound if that facilitates more uniform wetting of the support material. The optimal amount of solvent and concentration of the catalyst compound in the solvent will depend on the specific properties of the support material (surface area per gram, surface roughness, porosity, and so on) and can be determined on a case-by-case basis by those skilled in the art.

The catalyst dispersion is the percentage of the catalyst atoms that are at a free surface and thus able to interact with the reactants. The catalyst dispersion can range from about 0.1% to about 90%, in some embodiments about 0.1% to about 50%. Catalyst dispersion of between about 40-60% dispersion, in some embodiments about 50%, dispersion, corresponds to catalyst islands with a largest diameter of between about 2 nm to about 5 nm.

Catalyst decorated supports ranging from about 0.5 wt. % to about 20 wt. % metal catalyst, in some embodiments Ru, can be used. In some embodiments, the catalyst decorated supports can range from 0.05 wt. % of the metal to about 5 wt. % of the metal. In general, the metal dispersion decreases after a critical wt. % of the metal is exceeded because the metal starts to make larger islands instead of making small ones (i.e. largest length is between about 1 nm and about 5 nm), which is more desirable. Furthermore, the amount of catalyst supported can depend upon the support material. Transmission electron microscopy images suggest that BCA materials promote small Ru island formation, possibly due to Ru—Ba interactions at the Ru-BCA interface. Furthermore, although catalyst loading is normally given in wt. %, that amount can be misleading when comparing different support materials or different catalysts because each material has a different molecular mass. For example, iron (molecular weight about 55.85) is much lighter than ruthenium (molecular weight about 101.1), so a support with 1 wt. % Fe would have many more catalyst atoms than one with 1 wt. % Ru. In the end, optimal catalyst loading is determined empirically. For example, if going from 1 wt. % Ru to 2 wt. % Ru only increases the activity by 25%, it may be more economical to use 25% more 1 wt. % Ru decorated support in the reactor.

Ball Milling Method

An aspect of the invention is directed to a method of decorating the support powders with a catalyst metal, such as Ru. Ruthenium will be discussed in great detail, though it is understood that other catalysts or promoted catalysts can be used with this method without deviating from the invention. Ru carbonyl or $RuCl_3$ hydrate powders are added to the support powder along with enough organic solvent, nonlimiting examples include acetone or heptane, to make a loose paste. The amount of catalyst compound used is determined by the wt % catalytic metal desired on the finished catalyst-decorated support. This paste is comminuted using any suitable means. Nonlimiting comminuting examples include a planetary ball mill, for between about 5 minutes to about 1 hour, in some embodiments about 30 minutes, and at a speed between 100 rpm to about 1000 rpm, in some embodiments about 400 rpm. The speed of the ball mill can depend upon the model of the ball mill used in the process. This method breaks up the Ru compound and disperses it on the support powder without requiring the catalyst to be fully dissolved in the solvent. The milled Ru+support paste can be baked or annealed using methods and parameters known to those skilled in the art for a particular metal compound to convert the Ru compound to Ru metal or Ru oxide. $RuCl_3$ hydrate is the preferred Ru compound because it is much cheaper than Ru carbonyl.

Although this method can produce highly dispersed Ru, in some embodiments a dispersion greater than about 0% and up to about 90%, it can also cause a conductive support powder to become non-conductive, likely due to surface damage on the powder particles. Exposing the electrically conductive support powders to the Ru compound and solvent without milling does not remove its conductivity, and milling the conductive support powders without the Ru compound does remove its conductivity. The powder still retains its dark color, and therefore is still an electrically conductive core surrounded by a more insulating shell, which can be suitable to the $NH_3$ synthesis enhancement.

The insulating shell can be beneficial to electrical enhanced Haber-Bosch $NH_3$ synthesis because it will allow the CO-annealed powder to be used in an electric field mode as the insulating powder would not short circuit the capacitor plates. If the insulating shell still retains features that foster $N_2$ activation, it can be beneficial.

Wet Impregnation Method

An aspect of the invention is a wet impregnation of a catalyst support. Metal decoration of a catalyst support by wet impregnation involves dissolving a metal compound in a solvent to form a solution. The amount of catalyst compound used is determined by the desired wt % of catalyst metal in the final catalyst-decorated support. The quantity of solvent used must be at least enough to dissolve the amount of catalyst compound. Larger volumes of solvent can be used to ensure that the catalyst support can be fully covered by the solution and that the catalyst support can be easily mixed. The mixture can be periodically stirred, mixed, or similarly agitated to circulate the dissolved metal compound around the support material. The dissolved metal compound deposits on the support material's solution-accessible surfaces. A color change in the solution can indicate that the metal has transferred from the solvent to the support. The solution can be allowed to evaporate, or the decorated support material (i.e. support-catalyst powder) can be removed from the solution. After the decorated support material is removed from the solution, the dispersed metal compound on its surfaces can be converted to metal by an appropriate anneal known by those skilled in the art. For example, Ru carbonyl can be converted to Ru or Ru oxide by annealing at a temperature of between about 150° C. and about 450° C., in some embodiments about 250° C., in an inert or oxygen-containing atmosphere. The annealing temperature can be incrementally increased to the final annealing temperature and maintained at an interim temperature for greater than about 0 hours and less then about 12 hours. In some embodiments, the interim temperature is maintained for between about 30 seconds and about 2 hours. Alternatively, the annealing temperature can be ramped to the final annealing temperature at rates ranging from 0-600° C./minute. In some embodiments, $RuCl_3$ hydrate can be converted to Ru oxide or Ru metal in a similar way by annealing in oxidizing, inert, or reducing atmospheres. The specific annealing profile, temperatures, and atmosphere will depend on whether the catalyst compound is to be converted to a metal, oxide, or other compound. For example, $RuCl_3$ hydrate can be converted to ruthenium metal by annealing in a hydrogen atmosphere to a temperature between about 200° C. and about 500° C. The Ru metal can then be converted to an oxide by changing the annealing atmosphere from a hydrogen one to an oxygen one.

The solvent used with the method to decorate the support material will depend upon the material being dissolved in the solvent. The solvent must also be compatible with the support material. Thus, a comprehensive list of solvents is not possible. However, it is best that the material to be dissolved is highly soluble in the solvent, and that the solvent will evaporate quickly under the process conditions. The temperature of the solution can be adjusted so the catalyst compound dissolves more easily or to increase the solubility of the catalyst compound in the solvent or to alter the evaporation rate of the solvent. The atmosphere over the solution can be controlled to prevent solvent ignition if it has flash point lower than the desired process temperature. An enclosed atmosphere can also be used to suppress evaporation of the solvent. In some embodiments, the decoration process can be performed at room temperature in ambient air and the solvent can be a non-aqueous solvent (since the materials discussed here will hydrate or change phase when an aqueous solution is used).

Catalyst dispersion is the percentage of the catalyst atoms that are at a free surface and thus able to interact with the reactants. Catalyst dispersion of between about 40-60% dispersion, in some embodiments about 50%, dispersion, corresponds to catalyst islands between about 1 nm and about 5 nm in the largest length. Hydrogen chemisorption measurements of the annealed Ru-decorated BCA powder indicated a Ru dispersion around 20%. Transmission electron microscopy images suggested Ru features 5 nm or less in diameter.

The amount of catalyst supported can depend upon the support material. Some materials promote the formation of many small islands (i.e. less than 50 nm, greater than about 1 nm and less than about 40 nm in some embodiments) of catalyst at high catalyst loadings, while others promote formation of larger islands (i.e. greater than 50 nm, in some embodiments between about 60 nm and about 100 microns) as the loading increases. Many small islands typically better utilize the catalytic material because they have a higher dispersion (i.e. more of the atoms are exposed to reactants instead of surrounded by other catalytic material atoms inside the island), while fewer larger islands result in low dispersion and poor utilization of the catalyst material. Transmission electron microscopy images suggest that BCA materials promote small Ru island formation, possibly due to Ru—Ba interactions at the Ru-BCA interface. Furthermore, although catalyst loading is normally given in wt %, that amount can be misleading when comparing different support materials or different catalysts because each material has a different molecular mass. For example, iron (molecular weight about 55.85) is much lighter than ruthenium (molecular weight about 101.1), so a support with 1 wt % Fe would have many more catalyst atoms than one with 1 wt % Ru. In the end, optimal catalyst loading is determined empirically. For example, if going from 1 wt % Ru to 2 wt % Ru only increases the activity by 25%, it may be more economical to use 25% more 1 wt % Ru decorated support in the reactor.

Support Material

An aspect of the invention is a support material. The material is barium calcium aluminum oxide or a substituted barium calcium oxide, with or without a dopant. The material can be formed using the methods described herewith. In some embodiments, at least one component of the barium calcium aluminum oxide can be substituted with at least one secondary material. Thus, in some embodiments, at least a portion of the barium or calcium or aluminum can be substituted with a secondary material. Non-limiting examples of substituted barium calcium aluminum oxides include barium calcium boron oxide and barium calcium aluminum boron oxide.

In some embodiments, the barium calcium aluminum oxide can be decorated with a catalytic metal. By way of example, barium calcium aluminum oxide powder prepared as described here catalyzes $NH_3$ synthesis when decorated with about 0.1 wt. % and about 10 wt. % catalytic metal loading, in some embodiments between about 0.5-1 wt % catalytic metal loading. Less than 0.5 wt % Ru results in reduced $NH_3$ synthesis rates. Greater than 2 wt % Ru may not increase $NH_3$ synthesis rates and adds substantial cost to the Ru-decorated powder. In some embodiments, the barium calcium aluminate powder may not catalyze $NH_3$ synthesis by itself; some amount of a catalytic metal, for example Ru, is required.

Barium calcium aluminum oxide or substituted barium calcium aluminum oxide can act as a support for any $NH_3$ catalyst. Thus, while Ru decoration has been discussed in great detail and potentially yields the highest $NH_3$ synthesis rates, other catalysts can be used to decorate the BCA or BCA-substituted supports, including, Mo, Cr, Mn, Fe, Co, Mo—Co alloys, Os, Ni, Cu, and combinations thereof. The $NH_3$ synthesis rate can increase as the catalyst moves to the right in the periodic table (i.e. Cr<Mn<Fe<Co), suggesting that Ni and Cu decoration can yield good $NH_3$ synthesis rates. Based on its historical use as a $NH_3$ catalyst, Os will likely also produce good results. Oxides, nitrides, oxynitrides, hydrides, and mixtures of the above mentioned metals can also be used.

High Conductance Catalyst Beds

Catalyst-decorated barium calcium aluminate powder can be used as a $NH_3$ synthesis catalyst. The barium calcium aluminate powder can be formed into a high conductance catalyst bed by several methods. The specific conductance required of a catalyst bed will depend on the design of the specific reactor. In general, the catalyst bed must have sufficient conductance so that the pressure drop across the bed for the designed gas flow (a) does not adversely affect the reaction rate and (b) does not require an energy expenditure that makes the process too costly to be practical.

An aspect of the invention is a method to form the barium calcium aluminate powder or substituted barium calcium aluminate powder into pellets by extrusion, and the resulting pellets. A solvent can be combined with the barium calcium aluminate powder to form a "dough" (i.e. a thick, malleable mixture of the powder and solvent). Suitable solvents include acetone, hexane, heptane, mineral oil, heavier oils, and combinations thereof. In some embodiments, a binding agent can also be included in the mixture. The binding agent can be waxes, greases, methyl cellulose, and combinations thereof. The dough is shaped into pellets or other shapes. The solvent and/or binding agent can be allowed to evaporate or can be dried to remove the solvent and/or binding agent from the pellet thereby producing a dried pellet. The drying temperature can be determined by the vapor pressure of the solvent. The shape of the pellet can be any suitable shape, including a cylinder, a pyramid, a cube, a sphere, a sheet, a cuboid, or any other desired shape.

An aspect of the invention is a method to form catalyst-decorated barium calcium aluminate pellets by pressing the catalyst-decorated barium calcium aluminate powder or substituted barium calcium aluminate powder in a tablet press or similar device. The pellet may then be used "as-pressed." The pellets are also an aspect of the invention.

An aspect of the invention is a method to form barium calcium aluminate pellets by pressing the barium calcium aluminate powder or substituted barium calcium aluminate powder in a tablet press or similar device and then decorating the pellet's surface with Ru by the incipient wetness technique, and/or a wet impregnation technique. The resulting pellets are also an aspect of the invention.

An aspect of the invention is a method to form barium calcium aluminate pellets or substituted barium calcium aluminate pellets by pressing a barium calcium aluminate powder or substituted barium calcium aluminate powder, with or without pore-forming agents or flow-enhancing agents, in a tablet press, and the resulting pellets. The pore-forming or flow-enhancing agents can be at least one of corn starch, flour, cellulose, methyl cellulose, or waxes. The ratio of the powder to the pore-forming or flow-enhancing agent Scan be between about 1% and about 50% pore-former by volume. The resulting pellets are fired in a furnace using temperatures and atmospheres that cause the pore-forming agents to leave the pellets as a gas and cause the barium calcium aluminate powder granules to sinter. This creates a porous, mechanically robust pellet. The temperature can be between about 500° C. and about 1400° C., and the pellet can be maintained at the temperature for between about 10 minutes and about 10 hours. The atmosphere can contain from about 1% to 100% oxygen to convert the pore-formers to $CO_2$ while maintaining the BCA powder in its oxide state. The resulting pellet is then decorated with the catalyst by the incipient wetness technique or wet impregnation technique.

An aspect of the invention is a method to form barium calcium aluminate pellets or substituted barium calcium aluminate pellets by pressing a mixture of the catalyst support reagents, with or without pore-forming agents or flow-enhancing agents, in a tablet press, and the resulting pellets. The pore-forming or flow-enhancing agents can be at least one of corn starch, flour, cellulose, methyl cellulose, or waxes. The ratio of the powder to the pore-forming or flow-enhancing agent can be between about 1% and about 50% pore-former by volume. The resulting pellets are fired in a furnace using temperatures and atmospheres that cause the pore-forming agents to leave the pellets as a gas, cause the reagent powders to react to form barium calcium aluminate, and cause the barium calcium aluminate powder granules to sinter. This creates a porous, mechanically robust pellet. The temperature can be between about 500° C. and about 1400° C., and the pellet can be maintained at the temperature for between about 10 minutes and about 10 hours. The atmosphere can contain from about 1% to 100% oxygen to convert the pore-formers to $CO_2$ while maintaining the BCA powder in its oxide state. The resulting pellet is then decorated with Ru by the incipient wetness technique or wet impregnation technique.

An aspect of the invention is a method to wash coat a mechanical supporting structure with barium calcium aluminate powder or substituted barium calcium aluminate powder, and the resulting device. The mechanical supporting structure can be, for example, screens, sheets, honeycombs of structurally robust material. The powder is bonded to the structure by annealing at a temperature between about 300° C. and about 1400° C., for between about 10 minutes and about 10 hours, in an inert, oxidizing, or reducing atmosphere. The particular atmosphere composition and annealing temperature will depend on the composition of the support structure material. For example, bonding the wash coated BCA powder to an aluminum support structure can involve annealing at 300° C. in a reducing atmosphere to suppress oxide formation on the aluminum surface until the BCA powder particles are bonded to the metal, and then changing to an oxidizing atmosphere to passivate any remaining free aluminum surfaces. Exceeding 400° C. would risk melting many aluminum alloys. The sintered coating is decorated with Ru by the incipient wetness technique or wet impregnation technique.

An aspect of the invention is a method to wash coat a mechanical supporting structure with catalyst-decorated barium calcium aluminate powder or substituted barium calcium aluminate powder, and the resulting device. The mechanical supporting structure can be, for example, screens, sheets, honeycombs of structurally robust material. The powder is bonded to the structure by annealing at a temperature between about 300° C. and about 1400° C., for between about 10 minutes and about 10 hours, in an inert, oxidizing, or reducing atmosphere. The particular atmosphere composition and annealing temperature will depend on the composition of the support structure material. For example, bonding the wash coated catalyst-decorated BCA powder to an aluminum support structure can involve annealing at 300° C. in a reducing atmosphere to suppress oxide formation on the aluminum surface until the BCA powder particles are bonded to the metal, and then changing to an oxidizing atmosphere to passivate any remaining free aluminum surfaces. Exceeding 400° C. would risk melting many aluminum alloys. The temperature can be selected such that catalyst islands on the surface of the barium calcium aluminate powder do not diffuse into the powder granules (e.g. between about 300° C. and about 700° C.). The atmosphere composition should be selected to avoid reactions with the catalyst that can result in volatile catalyst compounds (e.g. chlorine or carbon monoxide in the case of a Ru catalyst).

An aspect of the invention is a method to disperse a catalyst-decorated barium calcium aluminate powder or substituted barium calcium aluminate powder across the surface of coarser materials to produce a catalyst bed with conductance about 5-50 times greater than can be achieved with powder alone. An example of a coarse material is between about 1-3 mm alumina grit. Ideal materials will exhibit good barium calcium aluminate powder adhesion and will not impair the catalytic properties of the metal-decorated barium calcium aluminate powder. One such material is alumina grit, but other materials may also be suitable, including iron grit, steel wool, glass grit, and mullite grit.

An aspect of the invention is a method is to disperse the catalyst-decorated barium calcium aluminate powder or substituted barium calcium aluminate powder across the surface of a coarse promoted-iron $NH_3$ catalyst, and the resulting device. Such promoted iron catalysts are commercially available, such as AmoMax 10 from Clariant. Dispersing the metal-decorated barium calcium aluminate powder on the surface of promoted-iron $NH_3$ catalyst will provide a high conductance catalyst bed containing two catalytic materials. The powder and granule catalysts will work in concert to produce a higher catalytic activity across a broader range of reactor conditions than either material can provide alone.

An aspect of the invention is a method to disperse the catalyst decorated barium calcium aluminate powder or substituted barium calcium aluminate powder on a mechanical support such as a screen, honeycomb or sheet, and the resulting device. The catalyst decorated powder can be adhered to the support by coating the support with a high temperature adhesive (for example, Cotronics DURALCO 6105SP stainless steel paint) and sprinkling the catalyst-decorated powder onto the paint before it dries. The dried paint will bond the catalyst decorated powder to the mechanical support without the need for annealing.

Method of Using the BCA or BCA-Substituted Support

The catalyst-decorated BCA or BCA-substituted powder can be used to synthesize $NH_3$ from a mixture of 1%-99% hydrogen in nitrogen heated to between 200° C. and 800° C. at pressure ranging from 0.1 atm to 300 atm. The specific reactant mixtures, pressures, temperatures, and gas flows depend on the specific apparatus used to contain the reaction and extract the $NH_3$ that is produced, and are known to those skilled in the art of $NH_3$ synthesis.

EXAMPLES

Example 1

A lab-scale differential test reactor has been used to test the $NH_3$ synthesis capability of Ru-decorated barium calcium aluminum oxide in a Haber-Bosch-type process. The catalyst support was a powder with a surface area around 4 $m^2$ $g^{-1}$ as measured by nitrogen BET analysis. Its surface was decorated with about 1 wt. % Ru by the incipient wetness method using $RuCl_3$ hydrate dissolved in acetone. The Ru metal dispersion was around 20% as measured by hydrogen chemisorption.

The reactor was run with about 1.019 g of about 1 wt % Ru-decorated nominal mixture of B7C2A3 and BA at a total pressure of about 140 psig and about 3:1 $H_2$:$N_2$ flow ratio. The nominal temperature of the catalyst was measured with metal sheathed thermocouples touching the supported catalyst holder. The reactants and supported catalyst may have been cooler than that temperature due to the poor radiation absorption characteristics of the reactant gases and the low thermal conductivity of the catalyst support.

Figure 4:
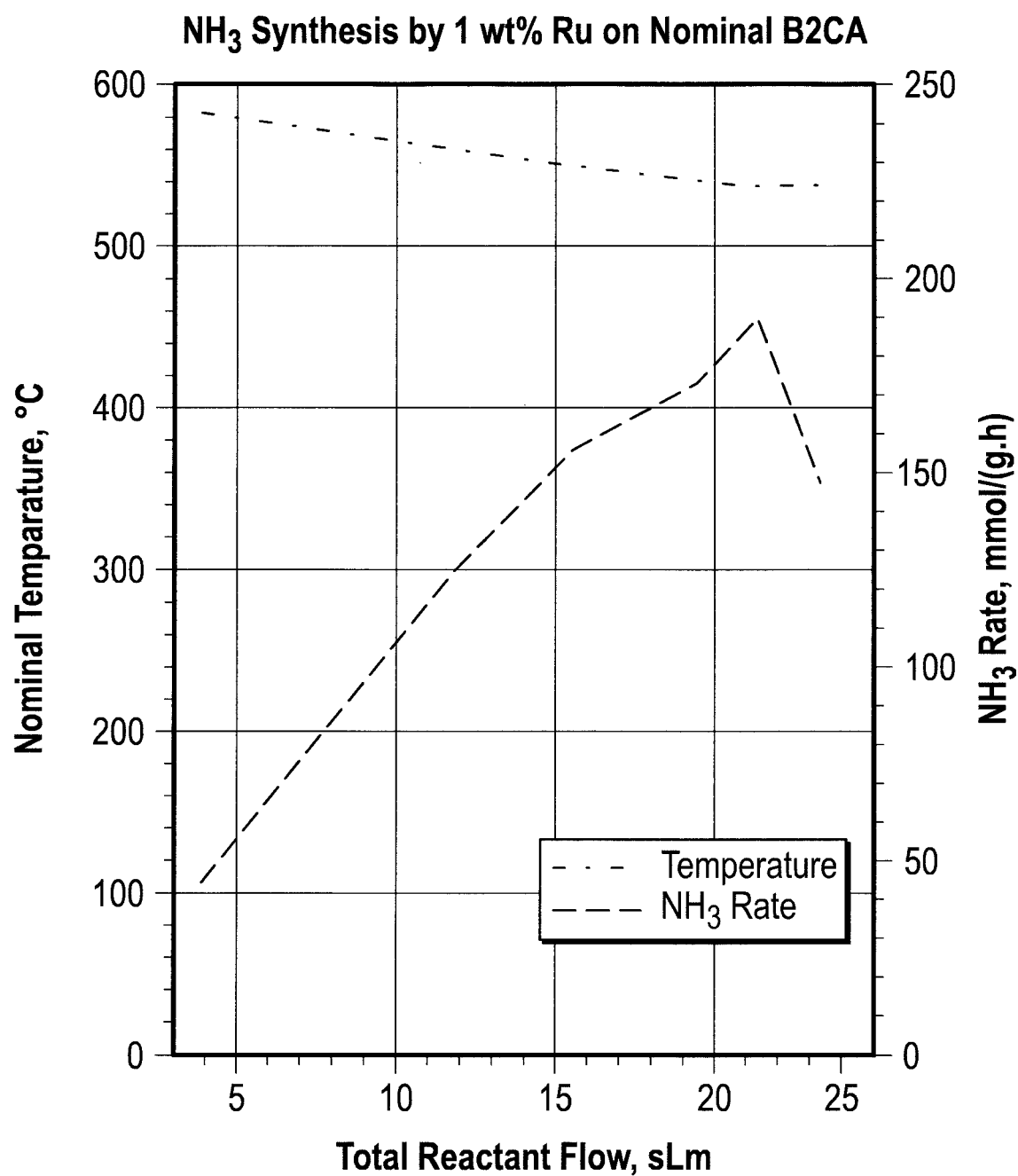
FIG. 4 illustrates the nominal catalyst temperature and $NH_3$ synthesis rate as a function of reactant flow for a catalyst comprised of 1 wt % Ru on nominal B2CA support.

The $NH_3$ synthesis rate and reference temperature were measured for total reactant flows ranging from about 3.8 sLm to 23.3 sLm, and are illustrated in FIG. 4. The $NH_3$ synthesis rate increased with increasing reactant flow, reaching around 190 mmol $g^{-1}$ $h^{-1}$ at about 23 sLm total reactant flow. The $NH_3$ synthesis rate decreased when the total flow was increased beyond about 23 sLm.

Similar experiments with other barium aluminate and barium calcium aluminate supports have indicated that supports with a larger proportion of B7C2A3 perform better than those with lower ones.

A complex barium calcium aluminum compound was made by supercritical drying to examine whether the $NH_3$ catalysis capability of Ru-decorated barium calcium aluminum oxide was due to its crystalline structure or its composition. Barium isopropoxide, calcium methoxide, and aluminum isopropoxide were mixed in methanol to give 2 Ba: 1 Ca: 1 Al molar ratio. This same molar ratio of reagents can be used for making B7C2A3+BA catalyst support. The mixture was heated to about 265° C. in a Parr reactor to form a supercritical mixture.

A valve on the Parr reactor was opened, causing the solvent to rapidly evaporate and leave behind a fine powder composed of barium, calcium, and aluminum compounds. The specific compounds are likely oxides, carbonates, hydroxides, and hydrides, but they are difficult to identify precisely because they have an amorphous structure and thus cannot be readily analyzed by x-ray diffraction.

The resulting powder was decorated with 1 wt % Ru by wet impregnation and its $NH_3$ catalysis capability was compared to that of 1 wt % Ru decorated B7C2A3+BA. The two catalysts supports performed nearly identically, suggesting that the crystal structure of the B7C2A3+BA is not the source of its $NH_3$ catalysis properties. It is more likely that the close proximity of proper ratios of Ba, Ca, and Al are the relevant factors.

Example 2

Figure 5:
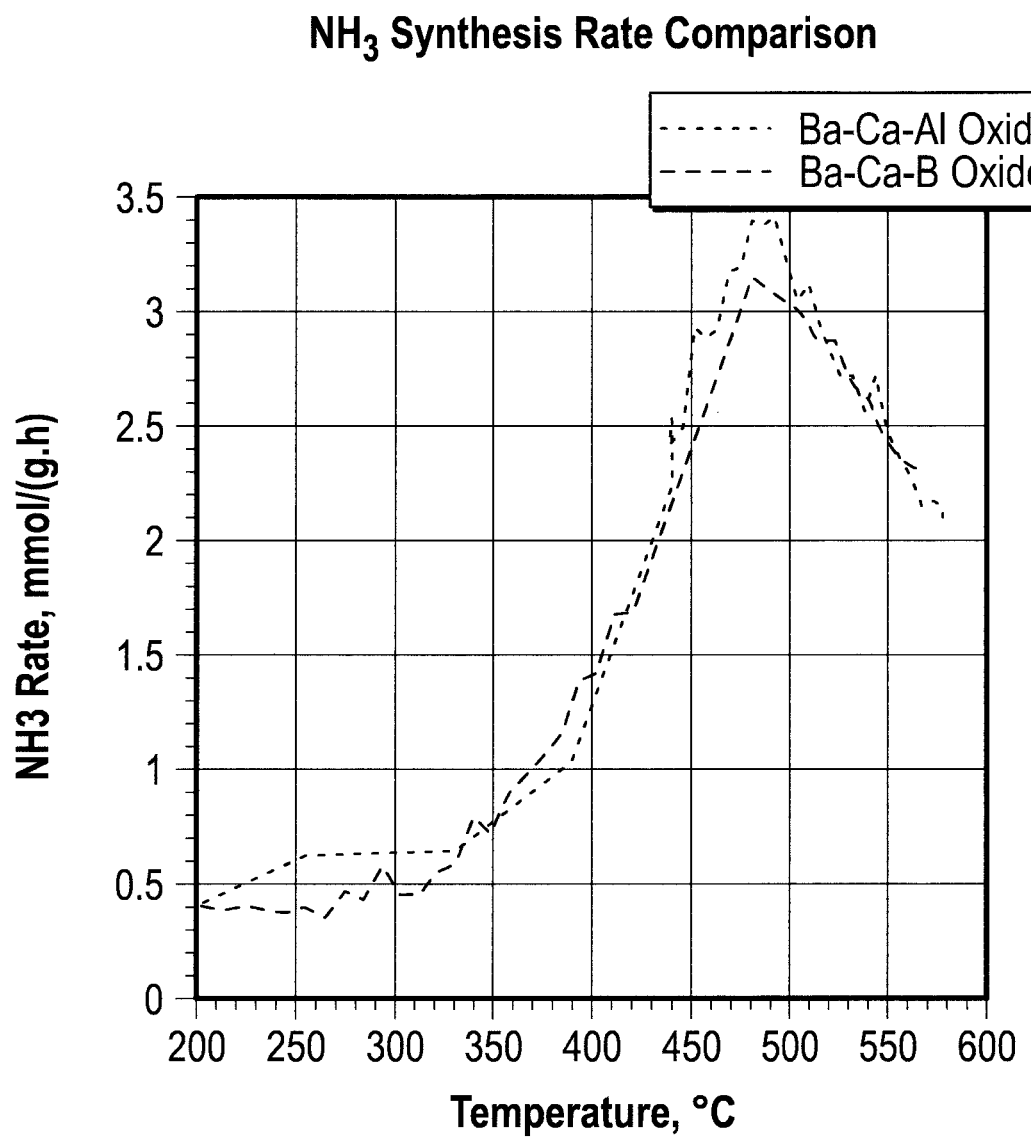
FIG. 5 illustrates $NH_3$ catalyst capabilities of barium calcium boron oxide and barium calcium aluminum oxide powders, each decorated with 1 wt % Ru.

A laboratory differential reactor was used to test the $NH_3$ catalysis capability of Ru-decorated barium calcium boron oxide powder. The barium calcium boron oxide powder was decorated with 1 wt % Ru using wet impregnation from a solution of $RuCl_3$ hydrate in acetone. FIG. 5 illustrates its $NH_3$ synthesis rate compared to a similarly prepared 1 wt % Ru-decorated barium calcium aluminum oxide catalyst. The two performed nearly identically under the test conditions.

Example 3

Barium calcium aluminum oxide powder made from B3C3A2 reagent stoichiometry as described in Example 5 was divided into two samples. One was annealed in a 1:1 $N_2$:$O_2$ mixture and the other was annealed in 100% CO. Both anneals consisted of a 5° C./min ramp to 900° C., a dwell at 900° C. for 15 hours, and a 5° C./min (or slower, limited by the tube furnace's natural cooling rate) ramp to room temperature. The 1:1 $N_2$:$O_2$ anneal caused no visible change to the barium calcium aluminum oxide powder. The CO anneal converted the barium calcium aluminum oxide from a white, electrically insulating powder to a gray, electrically conductive powder.

Figure 3:
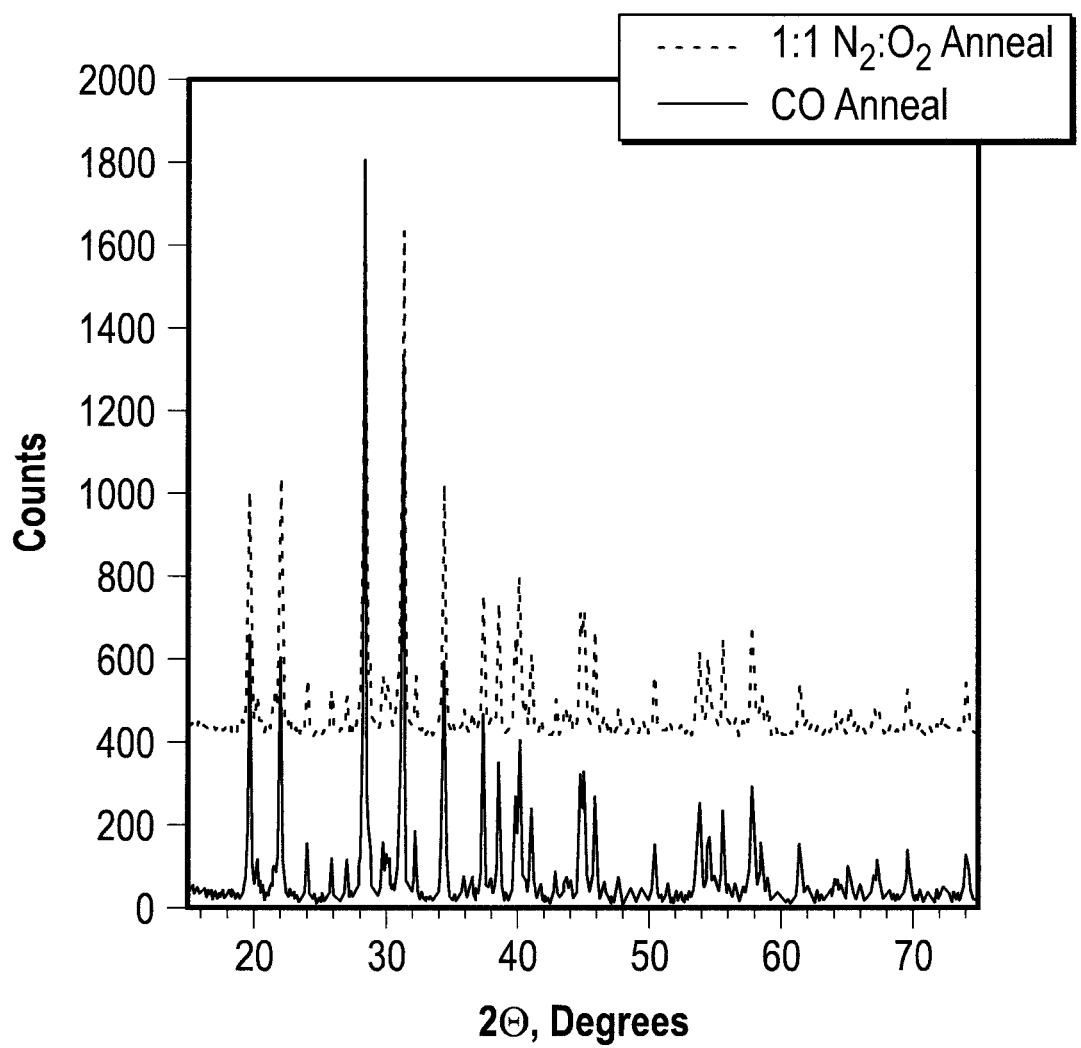
FIG. 3 illustrates the x-ray diffraction patterns of electrically insulating and electrically conductive barium calcium aluminum oxide powders.

FIG. 3 illustrates the x-ray diffraction patterns of both powders (i.e. $N_2$:$O_2$ annealed and CO annealed). The two patterns are both explained by the superposition of B7C2A3 and BA patterns (see Example 5). The diffraction patterns indicate that the 1:1 $N_2$:$O_2$ annealed powder and the CO annealed powder are structurally similar, suggesting that the change in color and electrical conductivity is due to the creation of oxygen vacancies in the material, rather than changes in the stoichiometry of the materials or crystalline structure. Oxygen vacancies are a common electrical conductivity mechanism in oxide materials.

Example 4

Barium calcium aluminum oxide can be decorated with Ru by wet impregnation using $RuCl_3$ hydrate dissolved in acetone. A sufficient volume of acetone can be added to a container to allow for easy stirring of the desired amount of barium calcium aluminate powder and complete dissolution of the intended amount of $RuCl_3$ hydrate. The volume of acetone can be sufficient to allow all of the powder to become suspended in the solvent during stirring. The $RuCl_3$ hydrate can be dissolved in the acetone to provide about 1 wt % Ru to the barium calcium aluminum oxide powder. The resulting $RuCl_3$ solution appeared dark green-black in color. The barium calcium aluminum oxide powder+$RuCl_3$ solution can be stirred periodically. A lid or other cover can be placed on the container between stirrings to prevent solvent evaporation. When the powder settled after each stirring, the color of the solution was noticeably lighter, while the powder in the solution was darker. The color change indicated that the $RuCl_3$ was depositing on the powder. After several stirrings, the solution was a nearly transparent, light color, indicating that substantially all of the $RuCl_3$ had deposited onto the barium calcium aluminum oxide powder. At this point, the acetone was allowed to evaporate from the uncovered container without further stirring.

After the acetone evaporated from the $RuCl_3$-decorated powder, the dry powder was placed in a tube furnace for annealing. It was annealed in 10% $H_2$+90% $N_2$ at ambient pressure. The anneal profile was successive about 1 hour dwells at about 150° C., about 250° C., about 350° C., and about 450° C. The ramps between temperatures were about 5° C./min. After the 450° C. dwell, the furnace was ramped to room temperature at about 5° C./min (or slower, limited by the tube furnace's natural cooling rate). This annealing has been shown to convert the $RuCl_3$ to Ru metal.

Hydrogen chemisorption measurements of the annealed Ru-decorated powder indicated a Ru dispersion around 20%. Transmission electron microscopy images suggested Ru features 5 nm or less in diameter.

Example 5

Barium oxide, calcium oxide, and aluminum oxide powders were combined in a molar ratio of 3:3:2. In particular, 24.881 g BaO, 9.102 g CaO, and 11.035 g $Al_2O_3$ were placed in a 500 mL agate planetary ball mill jar with 101 g of 5 mm agate grinding beads and 34 g of heptane to make a slurry or paste. This slurry or paste was milled at 200 rpm in a Retsch PM400 planetary ball mill for 30 minutes to mix the powders. After milling, the milling jar was moved to a fume hood and opened to allow the heptane to evaporate from the slurry. The dry powder and beads were passed through a coarse sieve to remove the beads. The mixed dry powder was annealed in a tube furnace under a 1:1 $N_2$:$O_2$ atmosphere. The anneal consisted of a 5° C./min ramp to 1300° C., a dwell at 1300° C. for 6 hours, and a 5° C./min (or slower, limited by the tube furnace's natural cooling rate)

ramp to room temperature. The annealed material was a white, electrically insulating powder.

Figure 6:
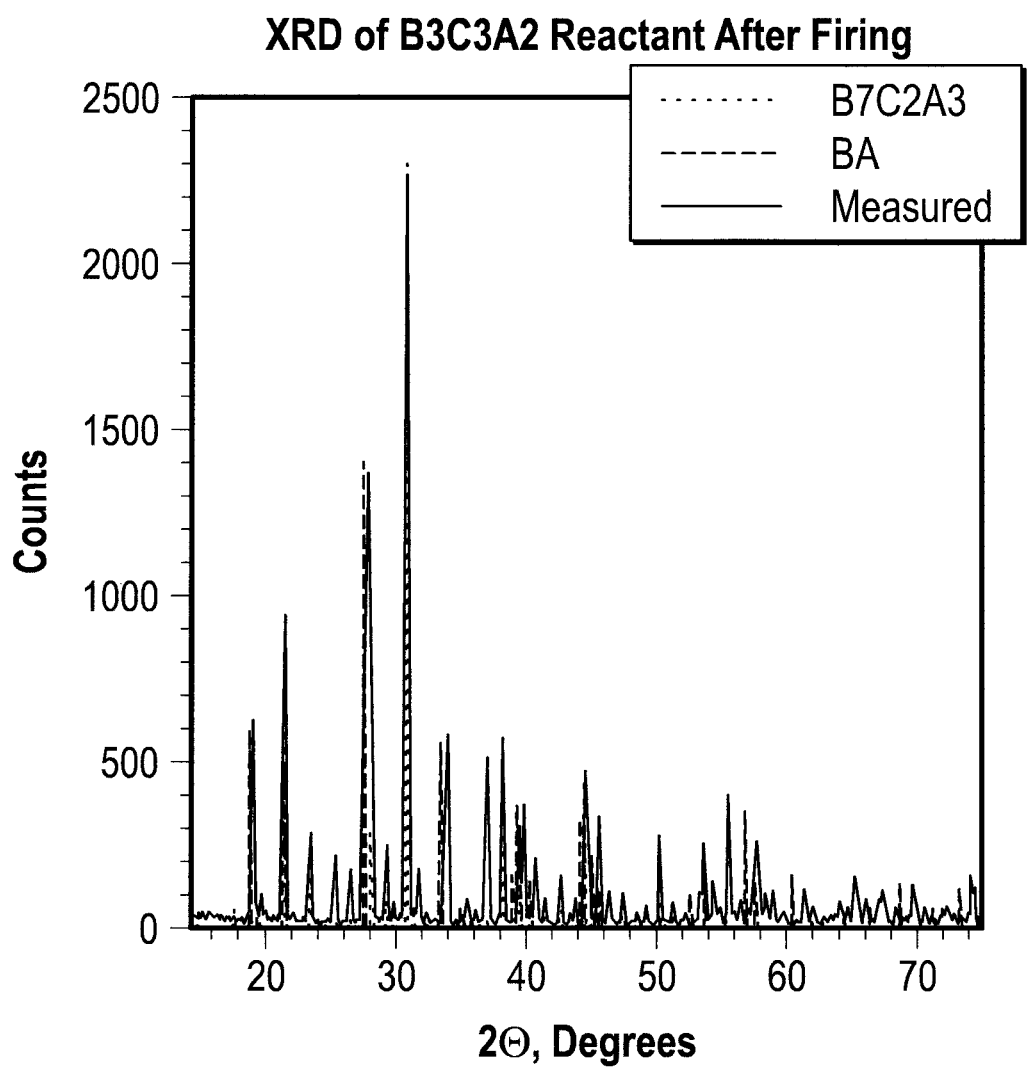
FIG. 6 illustrates an x-ray diffraction pattern of a barium calcium aluminum oxide material after the reagents were annealed at 1300° C. in 1:1 $N_2$:$O_2$ for 6 hours.

The structure of the annealed powder was examined by x-ray diffraction. FIG. 6 illustrates the x-ray diffraction pattern of the annealed powder. The pattern is well-matched by a superposition of B7C2A3 and BA peak positions. The B7C2A3 positions are not marked above about 55 degrees because they were not calculated for higher angles.

Example 6

The barium calcium aluminum oxide of Example 5 was decorated with Ru by the incipient wetness method using $RuCl_3$ hydrate dissolved in acetone. Sufficient $RuCl_3$ hydrate was dissolved in acetone to provide about 0.5 wt % Ru to the barium calcium aluminum oxide powder. The $RuCl_3$ solution was applied to the powder in several increments, each increment providing just enough solution to moisten the powder without leaving standing pools of the solution. The acetone was allowed to fully evaporate and the dry powder was stirred and leveled prior to the each $RuCl_3$ solution application. After all of the solution was applied, the dry powder was placed in a tube furnace for annealing in 10% $H_2$+90% $N_2$ at ambient pressure. The anneal profile consisted of successive 30-minute dwells at 100, 200, 300, 400, and 450° C. The ramps between temperatures were 5° C./min. After the 450° C. dwell, the furnace was ramped to room temperature at 5° C./min (or slower, limited by the tube furnace's natural cooling rate).

Example 7

A lab-scale differential test reactor was used to test the $NH_3$ synthesis capability of Ru-decorated barium calcium aluminum oxide from Example 6 in a Haber-Bosch-type process. The catalyst support was a –45 mesh powder with a surface area around 3.846 $m^2$ $g^{-1}$ as measured by nitrogen BET analysis. The powder surface was decorated with 0.5 wt. % Ru by the incipient wetness method using $RuCl_3$ hydrate dissolved in acetone.

The reactor was run with about 0.999 g of the Ru-decorated barium calcium aluminum oxide at a total pressure of 140 psig and a 2:1 $H_2$:$N_2$ flow ratio. The temperature of metal sheathed thermocouples adjacent to the supported catalyst holder were measured to be between about 575° C. and about 595° C.; it is estimated that the reactants and supported catalyst were 100-150° C. cooler than the thermocouple temperature due to the poor radiation absorption characteristics of the reactant gases and the low thermal conductivity of the catalyst support.

Figure 7:
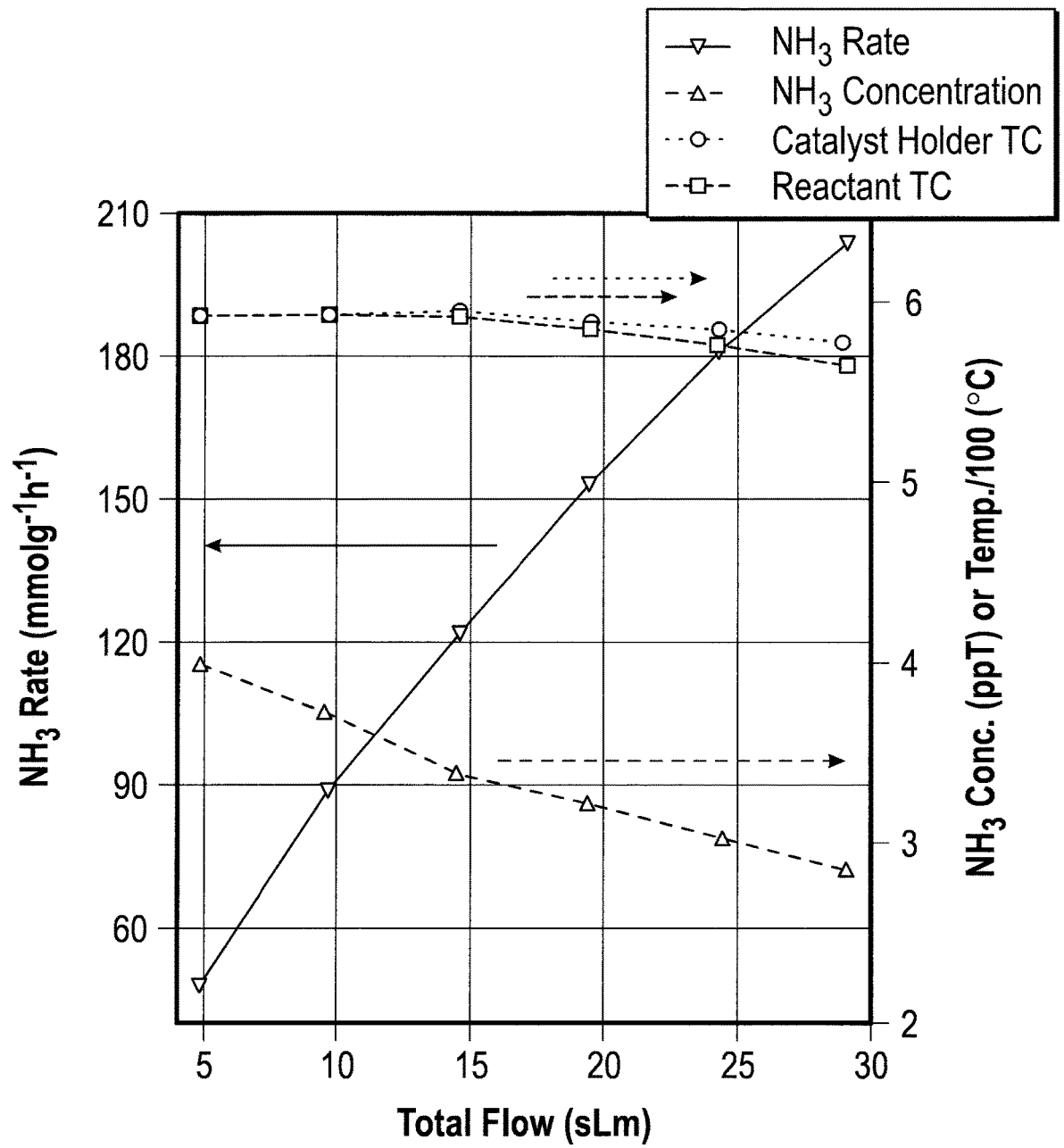
FIG. 7 illustrates the $NH_3$ synthesis ability of a barium calcium aluminum oxide support powder decorated with 0.5 wt % Ru.

The $NH_3$ synthesis rate, product gas $NH_3$ concentration, and reference temperatures were measured for total reactant flows ranging from 5 standard liters per minute to 30 standard liters per minute; these data are illustrated in FIG. 7. The $NH_3$ synthesis rate increased with increasing reactant flow, reaching around 203 mmol $g^{-1}$ $h^{-1}$ at around 30 standard liters per minute of total reactant flow.

In addition to the 140 psig total pressure measurements illustrated in FIG. 7, the $NH_3$ rate was measured at around 2 psig total pressure (about 1 bar) and found to be about 18 mmol $g^{-1}$ $h^{-1}$. For comparison, commercial $NH_3$ reactors using Fe-based catalysts achieve $NH_3$ synthesis rates of about 20 mmol eh' at temperatures of about 450° C. and pressures of between about 2000 psig and about 4000 psig.

Throughout this document, ranges have been discussed and used within the forgoing descriptions. One skilled in the art would understand that any sub-range within the stated ranges would be suitable, as would any number within the broad ranges, without deviating from the invention.

The foregoing descriptions of the present inventions have been presented for purposes of illustration and description. Furthermore, the descriptions are not intended to limit the inventions to the form disclosed herein. Consequently, variations and modifications commensurate with the above teachings, and the skill or knowledge of the relevant art, are within the scope of the present inventions. The embodiments described above are further intended to explain the best modes known for practicing the inventions and to enable others skilled in the art to utilize the inventions in such, or other, embodiments and with various modifications required by the particular applications or uses of the present inventions. It is intended that the appended claims be construed to include alternative embodiments to the extent permitted by the prior art.

The invention claimed is:

1. An ammonia catalyst construct comprising:
   a catalyst support material comprising one or more barium calcium aluminum oxide, or a combination of one or more substituted barium calcium aluminum oxide and one or more barium calcium aluminum oxide; and
   one or more catalytic metal, the one or more catalytic metal being decorated on the catalyst support material;
   wherein the one or more barium calcium aluminum oxide is selected from the group consisting of $Ba_7Ca_2Al_{16}O_{18}$ (B7C2A3) and $Ba_2CaAl_2O_5$ (B2CA).

2. The ammonia catalyst construct of claim 1, wherein the one or more catalytic metal is selected from the group consisting of Ti, V, Cr, Mn, Fe, Co, Ni, Cu, Mo, Ru, Rh, Pd, and Os.

3. The ammonia catalyst construct of claim 1, wherein the catalyst support comprises a combination of one or more substituted barium calcium aluminum oxide and one or more barium calcium aluminum oxide.

4. The ammonia catalyst construct of claim 3, wherein one of the one or more substituted barium calcium aluminum oxide comprises a barium calcium aluminum oxide wherein some or all of an aluminum component of the barium calcium aluminum oxide is substituted with one or more first dopants.

5. The ammonia catalyst construct of claim 4, wherein the first dopants are selected from the group consisting of indium, gallium, and boron.

6. The ammonia catalyst construct of claim 4, wherein one of the one or more substituted barium calcium aluminum oxide comprises barium calcium aluminum boron oxide.

7. The ammonia catalyst construct of claim 3, wherein one of the one or more substituted barium calcium aluminum oxide comprises a barium calcium aluminum oxide wherein some of a barium component of the barium calcium aluminum oxide and/or some of a calcium component of the barium calcium oxide is substituted with one or more second dopants.

8. The ammonia catalyst construct of claim 7, wherein the second dopants are selected from the group consisting of magnesium and strontium.

9. The ammonia catalyst construct of claim 1, wherein the catalyst support comprises at least one barium calcium aluminum oxide and at least one substituted barium calcium aluminum oxide.

10. The ammonia catalyst construct of claim 1, wherein the one or more catalytic metal is decorated on the catalyst support material with about 0.1 to about 10 wt. % catalytic metal loading.

11. The ammonia catalyst construct of claim 1, wherein the one or more catalytic metal is decorated on the catalyst support material with about 0.5 to about 1 wt. % catalytic metal loading.

\* \* \* \* \*